(12) United States Patent
Hu et al.

(10) Patent No.: US 11,474,831 B2
(45) Date of Patent: Oct. 18, 2022

(54) APPLICATION STARTUP CONTROL METHOD AND CONTROL DEVICE

(71) Applicant: HUAWEI TECHNOLOGIES CO., LTD., Guangdong (CN)

(72) Inventors: Huifeng Hu, Hangshou (CN); Jiechun Li, Beijing (CN); Xiaodong Su, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 16/387,643

(22) Filed: Apr. 18, 2019

(65) Prior Publication Data

US 2019/0243666 A1 Aug. 8, 2019

Related U.S. Application Data

(63) Continuation of application No. PCT/CN2017/106839, filed on Oct. 19, 2017.

(30) Foreign Application Priority Data

Oct. 20, 2016 (CN) .......................... 201610915687.0

(51) Int. Cl.
*G06F 9/46* (2006.01)
*G06F 9/445* (2018.01)
*G06F 9/50* (2006.01)

(52) U.S. Cl.
CPC ........ *G06F 9/44505* (2013.01); *G06F 9/5016* (2013.01); *G06F 9/5027* (2013.01); *G06F 2209/503* (2013.01)

(58) Field of Classification Search
CPC ................. G06F 9/5016; G06F 9/5027; G06F 2209/503; G06F 9/44505
See application file for complete search history.

(56) References Cited

U.S. PATENT DOCUMENTS 8,589,512 B2 * 11/2013 Ruiz-Velasco .......... H04L 67/34
709/217
8,818,329 B2 8/2014 Udeshi et al.
(Continued)

FOREIGN PATENT DOCUMENTS

CN 101009642 A 8/2007
CN 102831045 A 12/2012
(Continued)

OTHER PUBLICATIONS

Office action issued in Chinese Application No. 201780061841.5 dated Dec. 20, 2019, 22 pages (With English Translation).
(Continued)

*Primary Examiner* — Wissam Rashid
(74) *Attorney, Agent, or Firm* — Fish & Richardson P.C.

(57) ABSTRACT

The present disclosure relates to application startup control methods and control devices. One example method includes receiving information that is sent by a first application and that is used to trigger startup of a second application, determining, based on at least one of the information of the first application and a currently available resource amount of a system, whether to restrict the startup of the second application, where the information of the first application is used to indicate an importance degree of the first application in the system, and restricting the startup of the second application in response to determining to restrict the startup of the second application.

26 Claims, 7 Drawing Sheets

(56) References Cited

U.S. PATENT DOCUMENTS

| | | | |
|---|---|---|---|
| 9,137,262 | B2 | 9/2015 | Qureshi et al. |
| 9,871,741 | B2 | 1/2018 | Kurtzman et al. |
| 2007/0121665 | A1* | 5/2007 | Ergan ............... G06F 9/505 |
| | | | 370/455 |
| 2008/0211654 | A1 | 9/2008 | Kasamatsu |
| 2012/0102200 | A1 | 4/2012 | Rabii |
| 2012/0324481 | A1 | 12/2012 | Xia et al. |
| 2013/0332942 | A1 | 12/2013 | Ramesh et al. |
| 2014/0059578 | A1 | 2/2014 | Voth et al. |
| 2014/0173746 | A1 | 6/2014 | Armstrong-Muntner et al. |
| 2014/0223448 | A1* | 8/2014 | Varoglu ............ G06F 16/9535 |
| | | | 719/313 |
| 2014/0372356 | A1* | 12/2014 | Bilal ................ G06F 9/44578 |
| | | | 706/46 |
| 2015/0094949 | A1 | 4/2015 | Kato et al. |
| 2015/0256476 | A1 | 9/2015 | Kurtzman et al. |
| 2017/0269961 | A1 | 9/2017 | Fan et al. |

FOREIGN PATENT DOCUMENTS

| | | |
|---|---|---|
| CN | 103164229 A | 6/2013 |
| CN | 103425503 A | 12/2013 |
| CN | 103631661 A | 3/2014 |
| CN | 103870315 A | 6/2014 |
| CN | 104318154 A | 1/2015 |
| CN | 104407924 A | 3/2015 |
| CN | 104461576 A | 3/2015 |
| CN | 104461725 A | 3/2015 |
| CN | 104573495 A | 4/2015 |
| CN | 104573496 A | 4/2015 |
| CN | 104573497 A | 4/2015 |
| CN | 104598315 A | 5/2015 |
| CN | 104991803 A | 10/2015 |
| CN | 105045637 A | 11/2015 |
| CN | 105389203 A | 3/2016 |
| CN | 105630411 A | 6/2016 |
| CN | 105700942 A | 6/2016 |
| CN | 105740008 A | 7/2016 |
| CN | 105740078 A | 7/2016 |
| CN | 105824664 A | 8/2016 |
| CN | 105893153 A | 8/2016 |
| CN | 106055970 A | 10/2016 |
| CN | 106201574 A | 12/2016 |
| CN | 106227585 A | 12/2016 |
| CN | 107220077 A | 9/2017 |
| JP | H1031592 A | 2/1998 |
| JP | 2009134379 A | 6/2009 |
| JP | 2013175107 A | 9/2013 |
| JP | 2014501410 A | 1/2014 |
| KR | 20120139541 A | 12/2012 |
| KR | 20160105274 A | 9/2016 |
| WO | 2015138150 A1 | 9/2015 |
| WO | 2015154384 A1 | 10/2015 |
| WO | 2016026108 A1 | 2/2016 |
| WO | 2016105362 A1 | 6/2016 |

OTHER PUBLICATIONS

Yan et al.,"Fast app launching for mobile devices using predictive user context", MOBISYS 2012: 10TH International Conference on Mobile Systems, Applications and Services, XP055106616, Jan. 2012, 14 pages.

Extended European Search Report issued in European Application No. 17862584.4 dated Oct. 22, 2019, 7 pages.

Office Action issued in Korean Application No. 2019-7012743 dated Jun. 29, 2020, 9 pages (with English translation).

CN Search Report in Chinese Application No. 201610915687.0, dated Jan. 19, 2018.

PCT International Search Report and Written Opinion in International Application No. PCT/CN2017/106839, dated Jan. 18, 2018, 20 pages (with English translation).

Office Action issued in Chinese Application No. 201780061841.5 dated Feb. 19, 2021, 5 pages (with English translation).

Office Action issued in Korean Application No. 2019-7012743 dated Jan. 26, 2021, 4 pages (with English translation).

Office Action issued in Korean Application No. 2021-7012634 dated Jul. 29, 2021, 8 pages (with English translation).

Office Action issued in Chinese Application No. 202110471079.6 dated Jan. 27, 2022, 8 pages.

Office Action issued in Canadian Application No. 3,041,372 dated Dec. 22, 2021, 4 pages.

Office Action issued in Australian Application No. 2021202560 dated Jul. 4, 2022, 4 pages.

* cited by examiner

APPLICATION STARTUP CONTROL METHOD AND CONTROL DEVICE

CROSS-REFERENCE TO RELATED APPLICATIONS

This application is a continuation of International Application No. PCT/CN2017/106839, filed on Oct. 19, 2017, which claims priority to Chinese Patent 201610915687.0, filed on Oct. 20, 2016. The disclosures of the aforementioned applications are hereby incorporated by reference in their entireties.

TECHNICAL FIELD

This application relates to the field of information technologies, and more specifically, to an application startup control method and control device.

BACKGROUND

With continuous development of wireless communications technologies, operators provide various applications for user terminals.

As there are more applications, more resources are occupied by the applications. Due to improper use of an application, an operating system runs more slowly, freezes, or the like, thereby degrading system performance and user experience.

Therefore, how to properly control an application to improve system performance is a problem that needs to be resolved urgently.

SUMMARY

Embodiments of this application provide an application control method and control device, to properly control an application and improve system performance.

According to a first aspect, an application control method is provided, including: sorting a plurality of applications based on at least one of resource use information and user use information of the applications; and controlling sorted applications in the at least one application set.

Therefore, in this embodiment of this application, the plurality of applications are dynamically sorted based on the at least one of the resource use information of the applications and the user use information of the applications, to control the plurality of sorted applications. Therefore, the applications can be controlled in real time with reference to the resource use information of the applications and/or the user use information of the applications, resource waste can be avoided, and system performance and user experience can be improved.

Optionally, resource use information of an application may include a type and/or a resource amount of a resource used by the application.

Optionally, a resource mentioned in this embodiment of this application may include at least one of a central processing unit (CPU) resource, an input/output (IO) resource, and a memory resource.

Optionally, a currently available resource amount of a system mentioned in this embodiment of this application may be an absolute resource amount of each resource that is currently available in the system, for example, a currently available memory resource amount of the system is 500M; may be a percentage of an absolute resource amount of each resource that is currently available in the system in a total amount of each resource in the system, for example, a currently available memory resource amount of the system is 50%; or may be a weighted resource amount of a plurality of currently available resource amounts of the system, where a weighted value corresponding to each resource amount may be determined depending on an actual case.

Optionally, user use information of an application may include current user use information of the application (which may also be referred to as current running status information of the application), historical use information of the application, or the like.

Optionally, the current user use information of the application may include information used to indicate whether the application is currently being used, or is currently being used in the foreground or the background.

Optionally, the historical use information of the application may include at least one of the following information: use frequency of the application, duration of each use, and a jump relationship of the application.

Optionally, in this embodiment of this application, application control may include: restricting a resource for an application, restricting startup of an application, restricting startup of an associated application of an application, adding a resource for an application, allowing startup of an application, or allowing startup of an associated application of an application.

Optionally, a sorting manner of sorting applications in an application set based on at least one of resource use information and user use information of the applications may be performing sorting based on a control type.

Optionally, when the control type includes restricting a resource for an application, restricting startup of an application, or restricting startup of an associated application of an application, use frequency of an application is in positive correlation to a sorting rank of the application, or duration of each use is in positive correlation to a sorting rank of an application, or a quantity of jump objects is in positive correlation to a sorting rank of an application, or jump frequency is in positive correlation to a sorting rank of an application, where control is performed in ascending order of ranks.

When the control type includes allowing a resource for an application, allowing startup of an application, or allowing startup of an associated application of an application, use frequency of an application is in negative correlation to a sorting rank of the application, or duration of each use is in negative correlation to a sorting rank of an application, or a quantity of jump objects is in negative correlation to a sorting rank of an application, or jump frequency is in negative correlation to a sorting rank of an application, where control is performed in ascending order of ranks.

Optionally, when the control type includes restricting a resource for an application, restricting startup of an application, or restricting startup of an associated application of an application, a resource weighted sum of an application is in negative correlation to a sorting rank of the application, where control is performed in ascending order of ranks. When the control type includes allowing a resource for an application, allowing startup of an application, or allowing startup of an associated application of an application, a resource weighted sum of an application is in positive correlation to a sorting rank of the application, where control is performed in ascending order of ranks. The resource weighted sum of the application is determined based on usage and a weight of each of a plurality of resources occupied by the application.

It should be understood that a correlation between two factors mentioned in this embodiment of this application is a correlation between the two factors under an assumption that other factors are not considered or other factors are fixed.

It should be understood that, in this embodiment of this application, a value of a sorting rank may be further used to indicate a location in sorting. If the value of the sorting rank is relatively small, it may indicate that an application is ranked relatively ahead and is likely to be controlled.

It should be further understood that, in this embodiment of this application, a sorting rank may be a relative concept. For example, applications may be sorted based on use frequency of users, and shown in a form of a list. The applications are listed in the list in descending order of use frequency from top down. If control is restricting a resource for an application, restricting startup of an application, or restricting startup of an associated application of an application, a location close to the bottom of the list is a location ranked relatively ahead, and is likely to be controlled. If the control is allowing a resource for an application, allowing startup of an application, or allowing startup of an associated application of an application, a location close to the top of the list is a location ranked relatively ahead, and is likely to be controlled.

Optionally, in this embodiment of this application, the at least one application set is determined from a plurality of application sets. The at least one application set includes a plurality of applications. The plurality of applications included in the at least one application set are sorted based on the at least one of the resource use information and the user use information of the applications.

Optionally, in this embodiment of this application, the plurality of application sets are classified based on user experience and at least one of user use information of applications and attribute information of the applications.

Optionally, applications whose degrees of user experience fall within a same range may be grouped into a same application set based on at least one of user use information of the applications and attribute information of the applications.

Optionally, a sorting manner of an application set may be performing sorting based on a control type.

Specifically, if application control is restricting a resource for an application, restricting startup of an application, or restricting startup of an associated application of an application, an application with a relatively low degree of user experience is ranked relatively ahead, that is, is an application that is relatively likely to be controlled.

Specifically, if application control is adding a resource for an application, allowing startup of an application, or allowing startup of an associated application of an application, an application with a relatively high degree of user experience is ranked relatively ahead, that is, is an application that is relatively likely to be controlled.

Optionally, when the control includes restricting a resource for an application, restricting startup of an application, or restricting startup of an associated application of an application, and the currently available resource amount of the system is less than or equal to a first threshold, the at least one application set is determined from the plurality of application sets.

Therefore, in this embodiment of this application, when the currently available resource amount of the system is less than or equal to a threshold, an application set is selected and sorted, and a resource is restricted for an application, startup of an application is restricted, or startup of an associated application of an application is restricted. Application control may be performed with reference to a current resource use status of the system, and the application control may be performed more properly.

Optionally, the plurality of application sets are in one-to-one correspondence with a plurality of resource amount thresholds. An application set, whose corresponding resource amount threshold is greater than or equal to the currently available resource amount of the system, in the plurality of application sets is determined as the at least one application set that is to be selected. Optionally, the control includes at least one of the following: restricting a resource for an application in the plurality of sorted applications, restricting startup of an application in the plurality of sorted applications, and restricting startup of an associated application of an application in the plurality of sorted applications.

Therefore, in this embodiment of this application, different application sets are corresponding to different resource amount thresholds, and control specific to different application sets can be implemented.

Optionally, when the control includes adding a resource for an application, allowing startup of an application, or allowing startup of an associated application of an application, and the currently available resource amount of the system is greater than or equal to a second threshold, the at least one application set is determined from the plurality of application sets.

Therefore, in this embodiment of this application, when the currently available resource amount of the system is greater than or equal to a threshold, an application set is selected and sorted, and a resource is added for an application, startup of an application is allowed, or startup of an associated application of an application is allowed. Application control may be performed with reference to a current resource use status of the system, and the application control is performed more properly.

Optionally, the plurality of application sets are in one-to-one correspondence with a plurality of resource amount thresholds. An application set, whose corresponding resource amount threshold is less than or equal to the currently available resource amount of the system, in the plurality of application sets is determined as the at least one application set that is to be selected. Optionally, the control includes at least one of the following: adding a resource for an application in the plurality of sorted applications, allowing startup of an application in the plurality of sorted applications, and allowing startup of an associated application of an application in the plurality of sorted applications.

Optionally, in this embodiment of this application, a sorting manner of sorting applications in each application set is determined based on the currently available resource amount of the system; and the applications in each application set are sorted based on at least one of resource use information and user use information of the applications and according to the determined sorting manner.

Therefore, in this embodiment of this application, if the currently available resource amount of the system is different, a manner of sorting applications in an application set is different. A sorting manner may be determined in real time based on a resource amount, so that the sorting manner is more proper.

Optionally, in this embodiment of this application, the control includes restricting a resource for an application, restricting startup of an application, or restricting startup of an associated application of an application. The at least one application set includes a first application set, and the first application set includes a plurality of application subsets. When the currently available resource amount of the system is less than or equal to a third threshold and greater than a fourth threshold, the sorting manner is sorting applications in at least one of the plurality of application subsets based on user use information of the applications, where the fourth threshold is less than the third threshold; when the currently available resource amount is less than or equal to the fourth threshold and greater than a fifth threshold, the sorting manner is sorting applications in at least one of the plurality of application subsets based on resource use information of the applications, where the fifth threshold is less than the fourth threshold; or when the currently available resource amount of the system is less than or equal to the fifth threshold, the sorting manner is uniformly sorting all applications in the first application set based on resource use information of the applications.

Optionally, in this embodiment of this application, the control includes restricting a resource for an application, restricting startup of an application, or restricting startup of an associated application of an application. The at least one application set includes a second application set, and the second application set includes one application subset. When the currently available resource amount of the system is less than or equal to a sixth threshold and greater than a seventh threshold, the sorting manner is sorting applications in the second application set based on user use information of the applications, where the seventh threshold is less than the sixth threshold; or when the currently available resource amount is less than or equal to the seventh threshold, the sorting manner is sorting applications in the one application subset based on resource use information of the applications.

Optionally, in this embodiment of this application, the control includes adding a resource for an application, allowing startup of an application, or startup of an associated application of an application. The at least one application set includes a third application set, and the third application set includes a plurality of application subsets. When the currently available resource amount of the system is greater than or equal to an eighth threshold and less than a ninth threshold, the sorting manner is sorting applications in at least one of the plurality of application subsets based on user use information of the applications, where the eighth threshold is less than the ninth threshold; when the currently available resource amount is greater than or equal to the ninth threshold and less than a tenth threshold, the sorting manner is sorting applications in at least one of the plurality of application subsets based on resource use information of the applications, where the ninth threshold is less than the tenth threshold; or when the currently available resource amount of the system is greater than or equal to the tenth threshold, the sorting manner is uniformly sorting all applications in the third application set based on resource use information of the applications.

Optionally, in this embodiment of this application, the control includes adding a resource for an application, startup of an application, or startup of an associated application of an application. The at least one application set includes a fourth application set, and the fourth application set includes one application subset. When the currently available resource amount of the system is greater than or equal to an eleventh threshold and less than a twelfth threshold, the sorting manner is sorting applications in the fourth application set based on user use information of the applications, where the eleventh threshold is less than the twelfth threshold; or when the currently available resource amount is greater than or equal to the twelfth threshold, the sorting manner is sorting applications in the one application subset based on resource use information of the applications.

Optionally, the sorting applications in each of the at least one application set based on user use information of the applications includes:

sorting the applications in each application set based on usage and a weight of each of a plurality of resources occupied by each application in the application set.

It should be understood that, how to sort applications based on resource use information is limited herein; however, applications may alternatively be sorted based on both resource use information and user use information.

Therefore, in this embodiment of this application, the applications are sorted based on the usage and the weight of each of the plurality of resources occupied by each of a plurality of applications. During application control, the plurality of resources can be considered, so that resource waste can be avoided, and system performance is improved.

Optionally, the sorting applications in each of the at least one application set based on user use information of the applications includes: sorting the applications in each application set based on at least one of use frequency of the applications, duration of each use, and a jump relationship of the applications.

It should be understood that, how to sort applications based on user use information is limited herein; however, applications may alternatively be sorted based on both resource use information and user use information.

Therefore, in this embodiment of this application, the applications in each application set are sorted based on the at least one of the use frequency of the applications, the duration of each use, and the jump relationship of the applications. During application control, a degree of user experience can be considered.

Optionally, the applications in each application set are grouped based on association between the applications in the application set; application groups in the application set are sorted based on at least one of resource use information and user use information of applications in the application groups in the application set; and application groups in the at least one application set are controlled by using an application group as a unit.

Optionally, at least one of use frequencies, duration of each use, quantities of jump objects, jump frequencies, and resource usages of applications in each application group are respectively added up, and application groups are sorted based on a sum of corresponding parameters of each application group. Therefore, in this embodiment of this application, associated applications may be grouped into one group, and during application control, control is performed by using an application group as a unit. This can avoid waste of system resources and degradation of system performance.

According to a second aspect, an application startup control method is provided, including: receiving information that is sent by a first application and that is used to trigger startup of a second application; determining, based on at least one of the information of the first application and a currently available resource amount of a system, whether to restrict the startup of the second application, where the information of the first application is used to indicate an importance degree of the first application in the system; and restricting the startup of the second application when it is determined that the startup of the second application needs to be restricted.

Therefore, in this embodiment of this application, after the information that is sent by the first application and that is used to trigger the startup of the second application is received, it is determined, based on the at least one of the information of the first application and the currently available resource amount of the system, whether to restrict the startup of the second application; and the startup of the second application is restricted when it is determined that the startup of the second application needs to be restricted. Resource waste caused because startup of an application is frequently triggered by another application can be reduced, and therefore system performance can be improved.

Optionally, the information that is sent by the first application and that is used to trigger the startup of the second application may be broadcast information, that is, the first application may trigger the startup of the second application by using broadcast.

Optionally, the information that is sent by the first application and that is used to trigger the startup of the second application may be information specific to the second application, that is, the first application may trigger the startup of the second application in an application-specific manner.

Optionally, the information of the first application is used to indicate an importance degree of the first application in the system.

Optionally, the information of the first application may directly indicate the importance degree of the first application in the system. For example, the information of the first application may include priority information of the first application relative to a plurality of applications.

Specifically, the information of the first application includes level information of the first application, where the system includes a plurality of levels of applications, and the level information of the first application is used to indicate an application level to which the first application belongs.

Optionally, the information of the first application may indirectly indicate the importance degree of the first application in the system.

Specifically, the information of the first application may be attribute information of the first application, and the attribute information of the first application may be used to indicate whether the first application is a basic application that ensures normal running of the system. If the first application is a basic application that ensures normal running of the system, it indicates that the first application is relatively important in the system; or if the first application is not a basic application that ensures normal running of the system, it indicates that the first application is relatively unimportant in the system.

Optionally, in this embodiment of this application, the determining, based on at least one of the information of the first application and a currently available resource amount of a system, whether to restrict the startup of the second application includes: when the level information of the first application is used to indicate that the level of the first application is higher than a preset level, determining not to restrict the startup of the second application; or when the level information of the first application is used to indicate that the level of the first application is lower than or equal to the preset level, determining to restrict the startup of the second application.

Optionally, in this embodiment of this application, the determining, based on at least one of the information of the first application and a currently available resource amount of a system, whether to restrict the startup of the second application includes: when the currently available resource amount of the system is greater than or equal to a preset threshold, determining that the startup of the second application does not need to be restricted; or when the currently available resource amount of the system is less than a preset threshold, determining that the startup of the second application needs to be restricted.

Optionally, in this embodiment of this application, different application levels are corresponding to different resource amount thresholds; and the determining, based on at least one of the information of the first application and a currently available resource amount of a system, whether to restrict the startup of the second application includes: determining, based on the level information of the first application, the application level to which the first application belongs; determining a resource amount threshold corresponding to the application level to which the first application belongs; and when the currently available resource amount of the system is less than or equal to the resource amount threshold corresponding to the application level to which the first application belongs, determining to restrict the startup of the second application.

Therefore, in this embodiment of this application, different resource amount thresholds are set for different levels. Whether an associated application is to be started may be determined based on a level of using an application and with reference to the currently available resource amount of the system. Further, an application can be properly controlled, so that resources of the system are used in an optimal manner, and system performance are improved.

Optionally, in this embodiment of this application, each application level is corresponding to at least two resource amount thresholds, different resource amount thresholds in the at least two resource amount thresholds are corresponding to different startup restriction manners, and the method further includes: determining a maximum resource amount threshold that is in at least two resource amount thresholds corresponding to the application level to which the first application belongs and that is greater than or equal to a resource amount threshold of the currently available resource amount of the system; determining a startup restriction manner corresponding to the maximum resource amount threshold; and determining the startup restriction manner corresponding to the maximum resource amount threshold as a manner of restricting the startup of the second application; and the restricting the startup of the second application includes: restricting the startup of the second application in the determined manner.

Optionally, application levels of applications in the system are classified based on at least one of historical use information, attribute information, and current running status information of each application in the system.

Optionally, the historical use information of the application includes at least one of use frequency, duration of each use, and a jump relationship of the application; and/or the attribute information of the application includes information used to indicate whether the application is a basic application that ensures normal running of the system; and/or the current running status information of the application includes information used to indicate that the application is currently running in the foreground, or is running in the background and can be perceived by a user, or is running in the background and cannot be perceived by a user.

Optionally, the applications in the system include the following three application levels:

a first application level, including a basic application that ensures normal running of the system, and an application that is running in the foreground;

a second application level, including an application that is running in the background and that can be perceived by a user, and an application whose historical user usage is greater than a preset value; and a third application level, including another application in the system other than applications of the first application level and the second application level.

Optionally, a priority of the first application level is higher than a priority of the second application level, and the priority of the second application level is higher than a priority of the third application level, that is, an application of the second application level is more likely to be controlled compared with that of the first application level, and an application of the third application level is more likely to be controlled compared with that of the second application level.

Optionally, the method further includes:

determining a manner of restricting the startup of the second application; and the restricting the startup of the second application includes:

restricting the startup of the second application in the determined manner.

Optionally, the determining a manner of restricting the startup of the second application includes:

determining the manner of restricting the startup of the second application based on at least one of the information of the first application, the currently available resource amount of the system, and a manner of triggering the startup of the second application by the first application.

Specifically, the determining a manner of restricting the startup of the second application includes:

determining the manner of restricting the startup of the second application based on a correspondence between a startup restriction manner and at least one of information of an application, an available resource amount of the system, and a manner of triggering startup of the application, and at least one of the information of the first application, the currently available resource amount of the system, and the manner of triggering the startup of the second application by the first application.

Specifically, different application levels are corresponding to different resource amount thresholds, each application level is corresponding to at least two resource amount thresholds, different resource amount thresholds in the at least two resource amount thresholds are corresponding to different startup restriction manners, and the determining, based on at least one of the information of the first application and a currently available resource amount of a system, whether to restrict the startup of the second application includes:

determining, based on the level information of the first application, the application level to which the first application belongs; determining a resource amount threshold corresponding to the application level to which the first application belongs; and when the currently available resource amount of the system is less than or equal to the resource amount threshold corresponding to the application level to which the first application belongs, determining to restrict the startup of the second application; and the determining to restrict the startup of the second application includes: determining a maximum resource amount threshold that is in at least two resource amount thresholds corresponding to the application level to which the first application belongs and that is greater than or equal to a resource amount threshold of the currently available resource amount of the system; determining a startup restriction manner corresponding to the maximum resource amount threshold; and determining the startup restriction manner corresponding to the maximum resource amount threshold as a manner of restricting the startup of the second application. Optionally, the startup restriction manner includes delaying startup and prohibiting startup, and for a same application level, a resource amount threshold corresponding to the prohibiting startup is less than a resource amount threshold corresponding to the delaying startup.

Optionally, the information of the application includes level information of the application, the system includes a plurality of levels of applications, and the level information of the application is used to indicate an application level to which the application belongs; and/or an available resource of the system includes at least one of a CPU resource, an IO resource, and a memory resource; and/or the manner of triggering the startup of the application includes triggering the startup by using broadcast or triggering the startup in an application-specific manner.

Optionally, the manner of restricting the startup of the second application includes prohibiting starting the second application, or delaying starting the second application. Optionally, the correspondence may be preconfigured.

According to a third aspect, an application resource control method is provided. The method includes: determining an application associated with each of a plurality of applications; grouping the plurality of applications and the application associated with each application, to obtain a plurality of application groups, where applications included in each application group are associated applications; sorting the plurality of application groups; determining at least one application group from the plurality of application groups; and controlling an application in the at least one application group, where the control includes adding a resource or restricting a resource.

Therefore, in this embodiment of this application, applications are grouped into application groups based on association, and applications in each group are associated applications. In addition, when control is required, control is performed by using an application group as a unit. This can avoid resource waste caused because an associated application of an application is not controlled when the application is controlled.

Optionally, in this embodiment of this application, the plurality of application groups are sorted based on a resource amount occupied by each application group.

Optionally, the resource amount occupied by each application group is determined based on usage and a weight of each of a plurality of resources occupied by each application in an application group in the plurality of application sets, so as to sort priorities of application groups in the plurality of application sets.

Optionally, in this embodiment of this application, a group to which the first application belongs is adjusted based on sorting of application groups to which the at least two applications belong.

Specifically, the control includes restricting a resource, the first application and a second application of the at least two applications currently belong to a first application group, and when a priority of a second application group to which a third application of the at least two applications belongs is higher than that of the first application group, the first application is adjusted to belonging to the second application group, where a group with a low priority is a group for which a resource is likely to be restricted.

Specifically, the control includes adding a resource, and when a priority of a second application group to which a third application of the at least two applications belongs is higher than that of the first application group, the first application is adjusted to belonging to the second application group, where a group with a high priority is a group for which a resource is likely to be added.

According to a fourth aspect, an application control method is provided, including:

determining, based on usage and a weight of each of a plurality of resources occupied by each of a plurality of applications, a resource weighted sum of each resource; and determining a first application based on the resource weighted sum of each of the plurality of applications, and controlling the first application.

Therefore, in this embodiment of this application, an application that needs to be controlled is determined based on the usage and the weight of each of the plurality of resources occupied by each of the plurality of applications. During application control, the plurality of resources can be considered, so that resource waste can be avoided, and system performance is improved.

Optionally, before the determining, based on usage and a weight of each of a plurality of resources occupied by each of a plurality of applications, a resource weighted sum of each resource, the method further includes:

determining that the usage of each of the plurality of resources in the system reaches a corresponding threshold.

Optionally, before the determining a first application based on the resource weighted sum of each of the plurality of applications, the method further includes:

determining the plurality of applications from applications in the system based on priority sorting of the applications in the system.

Optionally, the determining the plurality of applications from applications in the system based on priority sorting of the applications in the system includes:

determining a first application set based on priority sorting of a plurality of application sets; and the determining a first application based on usage and a weight of each of a plurality of resources occupied by each of a plurality of applications includes:

determining the first application based on the resource weighted sum of each of the plurality of applications.

Optionally, application sets in the system are classified from a dimension of user experience and based on at least one of resource use information, user use information, and attribute information of applications in the system.

According to a fifth aspect, a control device is provided. The device is configured to perform the method in any one of the first to the fourth aspects or any optional implementation of the aspect.

Specifically, the device may include a unit configured to perform the method in any one of the first to the fourth aspects or any optional implementation of the aspect.

According to a sixth aspect, a control device is provided. The device includes a memory and a processor. The memory is configured to store an instruction. The processor is configured to execute the instruction stored in the memory, and the execution of the instruction stored in the memory enables the processor to perform the method in any one of the first to the fourth aspects or any optional implementation of the aspect.

According to a seventh aspect, a computer readable storage medium is provided. The computer readable storage medium stores an instruction. The instruction includes an instruction that enables, when executed, one or more processors to perform an operation in any one of the first to the fourth aspects or any optional implementation of the aspect.

DESCRIPTION OF EMBODIMENTS

The following clearly describes the technical solutions in the embodiments of this application with reference to the accompanying drawings in the embodiments of this application.

An application control method provided in the embodiments of this application may be applied to a control device. The control device may be a terminal device. The terminal device may also be referred to as user equipment (UE), a mobile station (MS), a mobile terminal, or the like. Optionally, the terminal device (hereinafter referred to as a terminal) may be capable of communicating with one or more core networks by using a radio access network (RAN). For example, the terminal may be a mobile phone (or referred to as a "cellular" phone), a set top box, a wearable device, an Internet of Things (IoT) device, or a computer having a mobility property. For example, the terminal may be a portable, pocket-sized, handheld, computer built-in, or in-vehicle mobile apparatus. It should be understood that, in addition to the terminal device, the application control method provided in the embodiments of this application may also be applied to another type of computer system.

Figure 1:
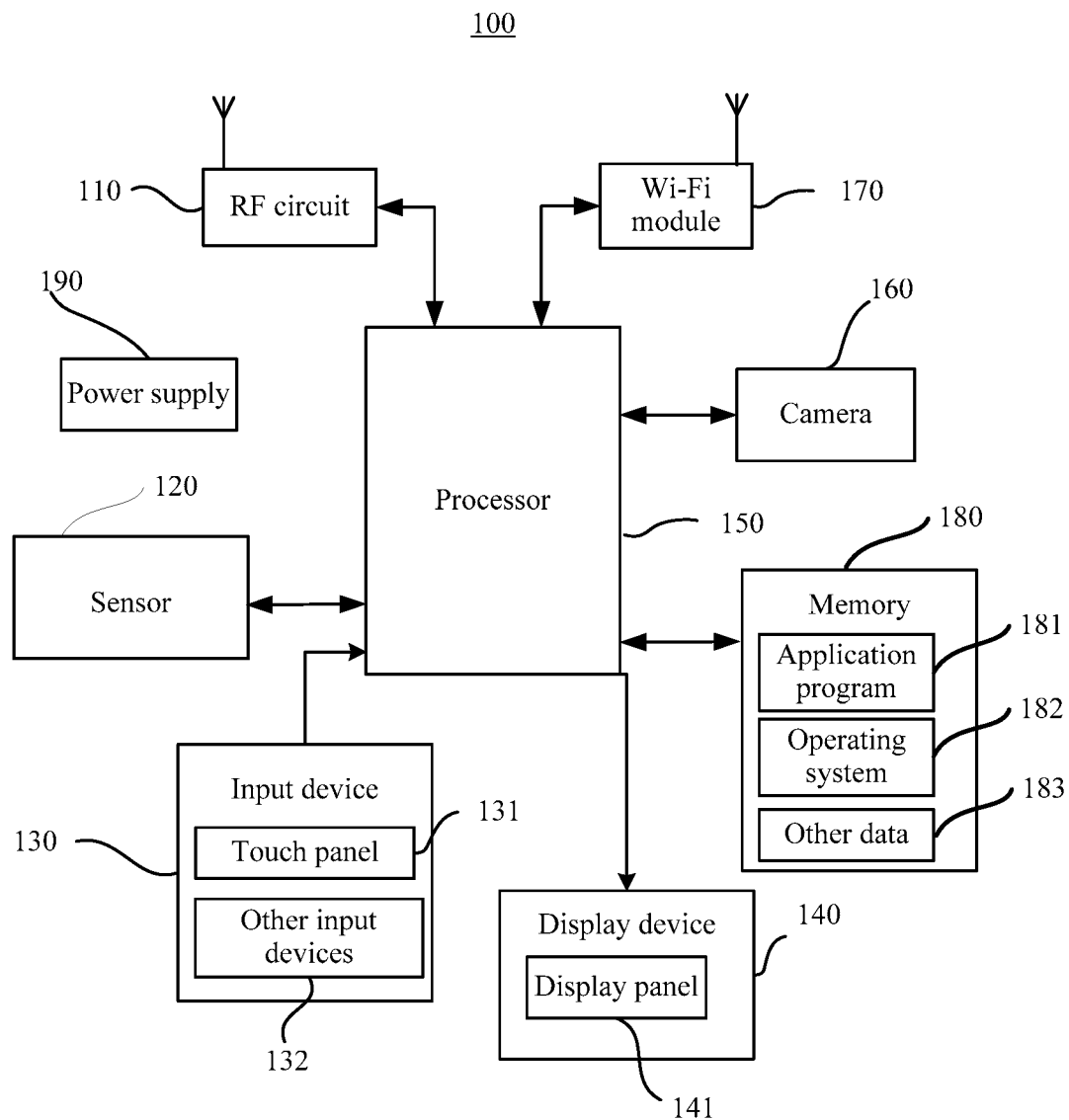
FIG. 1 is a schematic block diagram of a control device according to an embodiment of this application.

Referring to FIG. 1, FIG. 1 is a schematic structural diagram of a control device according to an embodiment of this application. As shown in FIG. 1, the control device 100 includes a memory 180, a processor 150, and a display device 140. The memory 180 stores a computer program (or referred to as program code), and the computer program includes an operating system 182, an application program 181, and the like. The processor 150 is configured to read the computer program in the memory 180 and then perform a method defined by the computer program. For example, the processor 150 reads the operating system program 182, so as to run an operating system on the control device 100 and implement various functions of the operating system; or reads one or more application programs 181, so as to run an application on the control device, process a broadcast message of an application program, or the like.

The processor 150 may include one or more processors. For example, the processor 150 may include one or more central processing units, or include one or more central processing units and one or more application processors. When the processor 150 includes a plurality of processors, the plurality of processors may be integrated in one chip, or may be independent chips. One processor may include one or more processor cores (or referred to as processing cores). All of the following embodiments are described by using multi-core as an example. However, a broadcast message management method provided in the embodiments of this application may also be applied to a single-core processor. Parallel running of a plurality of application programs is implemented by using a time division operating principle of the single-core processor.

In addition, the memory 180 further stores other data 183, in addition to the computer program. The other data 183 may include data generated after the operating system 182 or the application program 181 runs, or the like. The data includes system data (such as a configuration parameter of the operating system) and user data. For example, resource use information of applications is typical user data.

The memory 180 usually includes a memory and an external storage. The memory may be a random access memory, a read-only memory, a cache, or the like. The external storage may be a hard disk, an optical disc, a Universal Serial Bus (USB) flash drive, a floppy disk, a tape drive, or the like. The computer program is usually stored in the external storage, and before performing processing, the processor loads the computer program from the external storage to the memory.

The operating system program 182 includes a computer program that can be used to implement the application control method provided in the embodiments of this application, so that after the processor 150 reads the operating system program 182 and runs the operating system, the operating system may have a function of implementing the application control method provided in the embodiments of this application.

The control device 100 may further include an input device 130, configured to: receive digital information, character information, or a contact touch operation/non-contact gesture that is entered; and generate signal input and the like that are related to user setting and function control of the control device 100. Specifically, in this embodiment of this application, the input device 130 may include a touch panel 131. The touch panel 131 is also referred to as a touchscreen, and may collect a touch operation of a user on or around the touch panel (for example, an operation performed on or around the touch panel 131 by a user by using any proper object or accessory such as a finger or a stylus), and drive a corresponding connection apparatus according to a preset program. Optionally, the touch panel 131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, sends the contact coordinates to the processor 150, and can receive and execute a command sent by the processor 150. For example, a user double-taps an icon of an application program on the touch panel 131 by using a finger. The touch detection apparatus detects a signal brought by the double-tapping, and then transmits the signal to the touch controller. The touch controller then converts the signal into coordinates, and sends the coordinates to the processor 150. The processor 150 performs an operation, for example, starting the application program, based on the coordinates and a type (for example, double-tapping) of the signal. Finally, an operation interface of the application program is displayed on a display panel 141, so as to implement "starting" the application program.

The touch panel 131 may be implemented in a plurality of types such as a resistive type, a capacitive type, an infrared type, and a surface acoustic wave type. In addition to the touch panel 131, the input device 130 may further include other input devices 132. The other input devices 132 may include but are not limited to one or more of a physical keyboard, a function key (such as a volume control key or an on/off key), a trackball, a mouse, a joystick, and the like.

The display device 140 included in the control device 100 includes the display panel 141, configured to display information entered by a user or information provided for a user, various menu interfaces of the control device 100, and the like. In this embodiment of this application, the display device 140 is mainly used to display information such as a user operation interface of an application program. Optionally, the display panel 141 may be configured in a form of a liquid crystal display (LCD), an organic light-emitting diode (OLED), or the like. In some other embodiments, the touch panel 131 may cover the display panel 141 to form a touch display screen.

In addition to the foregoing, the control device 100 may further include a power supply 190 configured to supply power to another module, and a camera 160 configured to take a photo or a video. The control device 100 may further include one or more sensors 120, such as a gravity sensor, an acceleration sensor, and an optical sensor. The control device 100 may further include a radio frequency (RF) circuit 110, configured to perform network communication with a wireless network device, and may further include a Wi-Fi module 170, configured to perform Wi-Fi communication with another device, or the like.

In the following embodiments, an application control method provided in the embodiments of this application is described by using a control device as an execution body. The control method provided in the embodiments of this application may be implemented in the operating system program 182 shown in FIG. 1.

During running of the operating system program, if a running application occupies a relatively large amount of resources, the operating system program runs excessively slowly or freezes; or if a running application occupies a relatively small amount of resources, an available function in a system cannot satisfy a user requirement and a running speed of the application.

For example, after an application quits, the application is not immediately cleared from system memory. In this way, after the application is started next time, the application may not need to restart, thereby implementing fast startup. However, the system memory is limited, and available memory becomes less with continuous growth of applications.

For another example, an application A and an application B are associated applications. The application A and the application B need to jointly implement a function. When a resource of the application A is cleared, because a resource of the application B has not been cleared, startup of the application A is triggered, thereby causing waste of system resources and a relatively low running speed of the operating system program.

For another example, an application A and an application B are associated applications. The application A and the application B need to jointly implement a function. The application A frequently triggers startup of the application B, thereby causing waste of system resources and a relatively low running speed of the operating system program.

For another example, a running application occupies a relatively small amount of resources. Provided that a relatively large amount of CPU resources are currently available in the system, resource waste occurs if no CPU resource reallocation is performed for the running application.

Therefore, the embodiments of this application provide the application control method, to avoid resource waste and improve system performance.

Before the application control method in the embodiments of this application is described, terms mentioned in the embodiments of this application are described.

Optionally, in the embodiments of this application, an application may include at least one process, and one or more processes that can implement a specific function may be referred to as an application.

For example, a function A includes a sub-function 1 and a sub-function 2. All processes used to implement the function A may be grouped as one application. Alternatively, a process corresponding to the sub-function 1 may be grouped as one application, and a process corresponding to the sub-function 2 may be grouped as another application.

An application mentioned in the embodiments of this application may also be referred to as an application program.

In the embodiments of this application, applications may be classified, based on an attribute, into basic applications that ensure normal running of a system, and other applications. The basic applications may include a factory-preset application that has a persistent attribute, a native application, and the like.

Optionally, in the embodiments of this application, that a plurality of applications are associated means that the plurality of applications need to jointly implement a specific function (the specific function may be the function A, the sub-function 1, or the sub-function 2).

Optionally, in the embodiments of this application, application control may include: restricting a resource for an application, restricting startup of an application, restricting startup of an associated application of an application, adding a resource for an application, allowing startup of an application, or allowing startup of an associated application of an application.

Optionally, in the embodiments of this application, the restricting a resource for an application may be clearing all resources used by the application, such as a memory resource, a CPU resource, or an IO resource; or may be reducing resource usage of the application, for example, reducing CPU resource usage.

Optionally, in the embodiments of this application, resource usage of an application may be a percentage of resources occupied by the application in a resource amount of a system, and a currently available resource amount of a system is a percentage of currently available resources in a resource amount of the system. Certainly, a resource amount mentioned in the embodiments of this application may alternatively be an absolute amount. For example, memory usage may be a quantity of KBs occupied.

It should be understood that the embodiments of this application may be applied to an Android operating system, or may be applied to another operating system.

The following describes in detail the application control method in the embodiments of this application with reference to FIG. 2 to FIG. 7. The control method in the embodiments of this application may be performed by a control device. Optionally, the control device may be the control device shown in FIG. 1.

Figure 2:
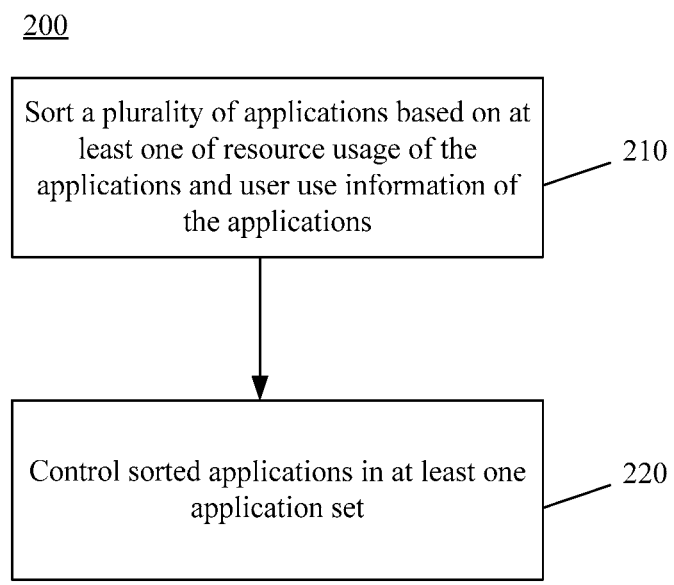
FIG. 2 is a schematic flowchart of a control method according to an embodiment of this application.

FIG. 2 is a schematic flowchart of an application control method 200 according to an embodiment of this application. The method 200 includes the following content.

Step 210: Sort a plurality of applications based on at least one of resource usage of the applications and user use information of the applications.

It should be understood that "plurality" mentioned in this embodiment of this application may indicate at least two.

Step 220: Control the plurality of sorted applications.

Optionally, user use information of an application may include current user use information of the application, historical use information of the application, or the like.

Optionally, the current user use information of the application may include information indicating whether the application is currently being used.

Optionally, the historical use information of the application may include at least one of the following information: use frequency of the application, duration of each use, and a jump relationship of the application.

Optionally, resource use information of an application may include a type and a resource amount of a resource used by the application.

Optionally, a sorting manner of sorting applications in an application set based on at least one of resource use information and user use information of the applications may be performing sorting based on a control type.

Optionally, when the control includes restricting a resource for an application, restricting startup of an application, or restricting startup of an associated application of an application, use frequency of an application is in positive correlation to a sorting rank of the application; or duration of each use is in positive correlation to a sorting rank of an application; or a quantity of jump objects is in positive correlation to a sorting rank of an application; or jump frequency is in positive correlation to a sorting rank of an application, where the control is performed in ascending order of ranks.

When the control includes allowing a resource for an application, allowing startup of an application, or allowing startup of an associated application of an application, use frequency of an application is in negative correlation to a sorting rank of the application; or duration of each use is in negative correlation to a sorting rank of an application; or a quantity of jump objects is in negative correlation to a sorting rank of an application; or jump frequency is in negative correlation to a sorting rank of an application, where the control is performed in ascending order of ranks.

Optionally, when the control includes restricting a resource for an application, restricting startup of an application, or restricting startup of an associated application of an application, a resource weighted sum of an application is in negative correlation to a sorting rank of the application, where the control is performed in ascending order of ranks.

When the control includes adding a resource for an application, allowing startup of an application, or allowing startup of an associated application of an application, a resource weighted sum of an application is in positive correlation to a sorting rank of the application, where the control is performed in ascending order of ranks. The resource weighted sum of the application is determined based on usage and a weight of each of a plurality of resources occupied by the application.

It should be understood that, in this embodiment of this application, a value of a sorting rank may be further used to indicate a location in sorting. If the value of the sorting rank is relatively small, it may indicate that an application is ranked relatively ahead and is likely to be controlled.

It should be understood that a correlation between two factors mentioned in the embodiments of this application is a correlation between the two factors under an assumption that other factors are not considered or other factors are fixed. However, this does not mean that the other factors are not considered.

For example, the plurality of applications may be sorted based on both the resource usage of the applications and the user use information of the applications.

Specifically, the plurality of applications may be sorted based on the resource usage. After sorting, a sequence number of an application a may be 1, a sequence number of an application b may be 2, a sequence number of an application c may be 3, and a sequence number of an application d may be 4. In addition, the plurality of applications are sorted based on the user use information. For example, after sorting, a sequence number of the application a may be 3, a sequence number of the application b may be 1, a sequence number of the application c may be 2, and a sequence number of the application d may be 4. Sequence numbers, obtained after sorting, of each application may be respectively added up. For example, after addition, a sequence number of the application a may be 4, a sequence number of the application b may be 3, a sequence number of the application c may be 5, and a sequence number of the application d may be 8. In addition, the applications are sorted again based on the sequence numbers obtained after addition. For example, in this case, a sequence number of the application b is 1, a sequence number of the application a is 2, a sequence number of the application c is 3, and a sequence number of the application d is 4.

Certainly, weighted processing may be performed on the sequence numbers. For example, if a sorting weighted value corresponding to the resource usage is 0.3, and a sorting weighted value corresponding to the user use information is 0.7, after sorting and weighted processing, a sequence number of the application a may be 2.4, a sequence number of the application b may be 1.3, a sequence number of the application c may be 2.3, and a sequence number of the application d may be 4.0. In addition, the applications are sorted again based on the sequence numbers obtained after weighted processing. For example, in this case, a sequence number of the application b is 1, a sequence number of the application a is 2, a sequence number of the application c is 3, and a sequence number of the application d is 4.

Optionally, at least one application set may be selected from a plurality of application sets, where the at least one application set includes a plurality of applications. The plurality of applications included in the at least one application set may be sorted based on at least one of resource usage of the applications and user use information of the applications.

Optionally, in this embodiment of this application, the plurality of application sets are classified and sorted based on user experience and at least one of user use information of applications and attribute information of the applications.

Optionally, applications whose degrees of user experience fall within a same range may be grouped into a same application set based on at least one of user use information of the applications and attribute information of the applications.

Optionally, a sorting manner of an application set may be performing sorting based on a control type.

For example, if application control is restricting a resource for an application, restricting startup of an application, or restricting startup of an associated application of an application, an application with a relatively low degree of user experience is ranked relatively ahead, that is, is an application that is relatively likely to be controlled.

For example, if application control is adding a resource for an application, allowing startup of an application, or allowing startup of an associated application of an application, an application with a relatively high degree of user experience is ranked relatively ahead, that is, is an application that is relatively likely to be controlled.

Optionally, when the control includes restricting a resource for an application, restricting startup of an application, or restricting startup of an associated application of an application, and a currently available resource amount of a system is less than or equal to a first threshold, the at least one application set is determined from the plurality of application sets.

It should be understood that, in this embodiment of this application, determining y based on x does not mean that determining is not performed based on other factors. For example, y may be determined based on x and z.

Optionally, the following application sets may be classified and sorted from a dimension of user experience and based on user use information of applications and attribute information of the applications.

Set of applications that need to be guaranteed

Applications in this set are applications for which a resource needs to be guaranteed, and are applications with a highest priority among applications in all sets. The applications in this set may include the following two subsets: a and b.

a. Applications that ensure normal running of an operating system: Applications in this subset may include a factory-preset application that has a persistent attribute and a native application.

b. Foreground applications: The foreground applications may be applications that are running and that are visible to users.

The set of applications that need to be guaranteed includes an application indispensable to system running and an application quite important to user experience. If no resource is guaranteed, a problem may be directly caused, for example, the system cannot run normally, or a user function is unavailable. No resource needs to be restricted for such applications, and the applications must be guaranteed. If system resources are insufficient, the applications in this set may not be controlled.

Set of applications that are preferably guaranteed

Applications in this set may be applications for which a resource is guaranteed to the greatest extent. A priority of this set is lower than that of the set of applications that need to be guaranteed. The applications in this set may include the following two subsets: c and d.

c. Key background applications: The key background applications may include background applications that can be perceived by (but are invisible to) users. For example, the applications include a background music play application and a background navigation application.

d. Applications frequently used by users.

When system resources are seriously insufficient, resources may be restricted for the applications in the set of applications that are preferably guaranteed. During system running, the applications belong to a list for which system resources preferably need to be guaranteed.

(3) Set of applications that can be restricted

Applications in this set may be applications that are restricted to the greatest extent. This set has a lowest priority. The applications in this set may include the following subsets: e and f.

e. Applications unimportant to the system. For example, the applications may include applications not frequently used by users.

f. Malicious applications. For example, the applications may be viruses, or applications that maliciously occupy a relatively large amount of resources.

When system resources are sufficient, resources may not be restricted for the applications in this set. However, when system resources are insufficient, the applications in this set may be restricted and cleared.

It should be understood that the foregoing division manner is merely an example in this embodiment of this application, and should not constitute a limitation on the scope of the embodiments of this application.

It should be further understood that a priority, a sorting rank, and a sorting location mentioned in this embodiment of this application are relative concepts, and may be determined depending on a specific case.

For example, applications may be sorted based on use frequency of users, and shown in a form of a list. The applications are listed in the list in descending order of use frequency from top down. If control is restricting a resource for an application, restricting startup of an application, or restricting startup of an associated application of an application, a location close to the bottom of the list is a location ranked relatively ahead, and is likely to be controlled. If the control is allowing a resource for an application, allowing startup of an application, or allowing startup of an associated application of an application, a location close to the top of the list is a location ranked relatively ahead, and is likely to be controlled. For example, in this embodiment of this application, a high priority may indicate relatively high importance to the users or the system, a low probability of restricting a resource, or a high probability of startup or associated startup.

For another example, a priority may be related to the control type. For example, for the restricting a resource, a high priority may mean a high probability of restricting a resource. For example, for the adding a resource, a high priority may mean a high probability of adding a resource.

In this embodiment of this application, in many cases, priority division is performed based on importance to the users or the system. However, it should be understood that this embodiment of this application is not limited thereto.

A threshold of the aforementioned being frequently used by users may be configured based on use frequency of the users and duration of each use.

Optionally, in this embodiment of this application, the at least one application set may be selected from the plurality of application sets based on sorting of the plurality of application sets, and applications in each of the selected at least one application set are sorted.

A quantity of selected application sets may be determined based on the currently available resource amount of the system.

For example, if the currently available resource amount of the system is less than a threshold a, one application set is selected; or if the currently available resource amount of the system is less than a threshold b, two application sets are selected, where b is less than a.

For another example, if the currently available resource amount of the system is greater than a threshold c, one application set is selected; or if the currently available resource amount of the system is greater than a threshold d, two application sets are selected, where d is greater than c.

Optionally, the plurality of application sets are in one-to-one correspondence with a plurality of resource amount thresholds. An application set, whose corresponding resource amount threshold is greater than or equal to the currently available resource amount of the system, in the plurality of application sets is determined as the at least one application set that is to be selected.

In this case, the control includes at least one of the following: restricting a resource for an application in the plurality of sorted applications, restricting startup of an application in the plurality of sorted applications, and restricting startup of an associated application of an application in the plurality of sorted applications.

For example, for memory, a set A is corresponding to a threshold 200M, and a set B is corresponding to a threshold 400M. When a currently available memory resource amount of the system is less than or equal to 400M, applications in the set B may be sorted; or when a currently available memory resource amount of the system is less than or equal to 200M, applications in the sets A and B may be sorted.

Optionally, the plurality of application sets are in one-to-one correspondence with a plurality of resource amount thresholds. An application set, whose corresponding resource amount threshold is less than or equal to the currently available resource amount of the system, in the plurality of application sets is determined as the at least one application set that is to be selected. In this case, the control includes at least one of the following: adding a resource for an application in the plurality of sorted applications, allowing startup of an application in the plurality of sorted applications, and allowing startup of an associated application of an application in the plurality of sorted applications.

For example, for memory, a set C is corresponding to a threshold 600M, and a set D is corresponding to a threshold 800M. When a currently available memory resource amount of the system is greater than or equal to 600M, applications in the set C may be sorted; or when a currently available memory resource amount of the system is greater than or equal to 800M, applications in the sets C and D may be sorted.

It should be understood that a sequence between sorting and control is not limited in this embodiment of this application.

For example, when the currently available resource amount of the system is less than or equal to a threshold, and at least two application sets are selected, applications in one set may be first sorted, and resources in the set are restricted. After the resources in the set are restricted, if the currently available resource amount of the system is greater than a threshold corresponding to another application set, no sorting is performed on the another application set.

For example, when the currently available resource amount of the system is greater than or equal to a threshold, and at least two application sets are selected, applications in one set may be first sorted, and a resource is added for the applications in the set. After the resource is added for the applications in the set, if the currently available resource amount of the system is less than a threshold corresponding to another application set, no sorting is performed on the another application set.

For another example, alternatively, all applications may be first sorted, and then the sorted applications are controlled.

Optionally, in this embodiment of this application, a sorting manner of sorting applications in each application set may be determined based on the currently available resource amount of the system, and the applications in each application set are sorted in the determined manner.

Optionally, in this embodiment of this application, the control includes restricting a resource for an application, restricting startup of an application, or restricting startup of an associated application of an application. The at least one application set includes a first application set, and the first application set includes a plurality of application subsets. When the currently available resource amount of the system is less than or equal to a third threshold and greater than a fourth threshold, the sorting manner is sorting applications in at least one of the plurality of application subsets based on user use information of the applications, where the fourth threshold is less than the third threshold; when the currently available resource amount is less than or equal to the fourth threshold and greater than a fifth threshold, the sorting manner is sorting applications in at least one of the plurality of application subsets based on resource use information of the applications, where the fifth threshold is less than the fourth threshold; or when the currently available resource amount of the system is less than or equal to the fifth threshold, the sorting manner is uniformly sorting all applications in the first application set based on resource use information of the applications.

For example, it is assumed that the set of applications that are preferably guaranteed is selected, and the set of applications that are preferably guaranteed includes the subset of key background applications and the subset of applications frequently used by users. If the currently available resource amount of the system is less than or equal to 50% and greater than 35%, applications in the subset of applications frequently used by users may be sorted based on user use information of the applications, and resources are restricted for the applications in the subset of applications frequently used by users. After resources are restricted for all the applications in the subset of applications frequently used by users, if the currently available resource amount of the system still does not meet a requirement, applications in the subset of key background applications may be sorted based on user use information of the applications, and resources are restricted for the applications in the subset of key background applications based on sorting of the applications in the subset of key background applications. Alternatively, applications in the subset of key background applications, and applications in the subset of applications frequently used by users may be sorted based on user use information of the applications, and resources are first restricted for the applications in the subset of applications frequently used by users. After resources are restricted for all the applications in the subset of applications frequently used by users, if the currently available resource amount of the system still does not meet a requirement, resources may be restricted for the applications in the subset of key background applications based on sorting of the applications in the subset of key background applications.

If the currently available resource amount of the system is less than or equal to 35% and greater than 20%, sorting may be performed on the subset of applications frequently used by users and/or the subset of key background applications based on resource use information of the applications. For sorting and a resource restriction manner, refer to the descriptions of the sorting and the resource restriction manner based on the user use information of the applications.

If the currently available resource amount of the system is less than or equal to 20%, applications in the set of applications that are preferably guaranteed may be uniformly sorted based on resource use information and user use information of the applications. To be specific, sorting may be performed on the subset of applications frequently used by users and the subset of key background applications in a mixed manner. In this case, during sorting, the subset of applications frequently used by users and the subset of key background applications are not distinguished, and resources are restricted for the applications sorted in the mixed manner.

It should be understood that, in addition to the foregoing sorting manners, there are other sorting manners in this embodiment of this application. This is not particularly limited in this embodiment of this application.

For example, when the currently available resource amount is less than or equal to the third threshold and greater than the fourth threshold, the sorting manner is performing sorting on the at least one of the plurality of application subsets based on both the resource use information of the applications and the user use information of the applications; or when the currently available resource amount of the system is less than or equal to the fourth threshold, the sorting manner is uniformly sorting all the applications in the first application set based on both the resource use information of the applications and the user use information of the applications.

For another example, when the currently available resource amount is less than or equal to the third threshold and greater than the fourth threshold, the sorting manner is uniformly sorting all the applications in the first application set based on the user use information of the applications; or when the currently available resource amount of the system is less than or equal to the fourth threshold, the sorting manner is uniformly sorting all the applications in the first application set based on both the resource use information of the applications and the user use information of the applications.

Optionally, in this embodiment of this application, the control includes adding a resource for an application, allowing startup of an application, or allowing startup of an associated application of an application. The at least one application set includes a third application set, and the third application set includes a plurality of application subsets. When the currently available resource amount of the system is greater than or equal to an eighth threshold and less than a ninth threshold, the sorting manner is sorting applications in at least one of the plurality of application subsets based on user use information of the applications, where the eighth threshold is less than the ninth threshold; when the currently available resource amount is greater than or equal to the ninth threshold and less than a tenth threshold, the sorting manner is sorting applications in at least one of the plurality of application subsets based on resource use information of the applications, where the ninth threshold is less than the tenth threshold; or when the currently available resource amount of the system is less than or equal to the tenth threshold, the sorting manner is uniformly sorting all applications in the third application set based on resource use information of the applications.

Optionally, in this embodiment of this application, the control includes adding a resource for an application, startup of an application, or startup of an associated application of an application. The at least one application set includes a fourth application set. The fourth application set includes one application subset. When the currently available resource amount of the system is greater than or equal to an eleventh threshold and less than a twelfth threshold, the sorting manner is sorting applications in the fourth application set based on user use information of the applications, where the eleventh threshold is less than the twelfth threshold; or when the currently available resource amount is greater than or equal to the twelfth threshold, the sorting manner is sorting all applications in the one application subset based on resource use information of the applications.

It should be understood that a threshold mentioned in this embodiment of this application may be determined depending on an actual case, for example, may be determined depending on a system performance requirement of a user.

It should be further understood that, in this embodiment of this application, "first", "second", "third", and the like are merely used for ease of description, and should not be assigned with excessive meanings. For example, the second threshold may exist when there is no first threshold.

It should be further understood that the first threshold, the second threshold, the third threshold, and the like mentioned in this embodiment of this application may be equal, unless otherwise specified that the thresholds are different.

For example, the first threshold may be equal to the third threshold, the fourth threshold, the fifth threshold, the sixth threshold, or the seventh threshold.

For example, the third threshold may be equal to the sixth threshold or the seventh threshold.

For example, the fourth threshold may be equal to the sixth threshold or the seventh threshold.

For example, the fifth threshold may be equal to the sixth threshold or the seventh threshold.

For example, the second threshold may be equal to the eighth threshold, the ninth threshold, the tenth threshold, the eleventh threshold, or the twelfth threshold.

For example, the eighth threshold may be equal to the eleventh threshold or the twelfth threshold.

For example, the ninth threshold may be equal to the eleventh threshold or the twelfth threshold.

For example, the tenth threshold may be equal to the eleventh threshold or the twelfth threshold.

Optionally, in this embodiment of this application, the currently available resource amount of the system or resource usage of a user may be a resource amount of a single resource, or a weighted amount of a plurality of resources.

For example, if the currently available CPU resource amount of the system is less than or equal to a preset threshold, the applications in the at least one application set may be sorted based on CPU usage of each application.

For another example, if the currently available memory resource amount of the system is less than or equal to a preset threshold, the applications in the at least one application set may be sorted based on memory usage of each application.

For another example, if both the currently available CPU resource amount and the currently available memory resource amount of the system are less than or equal to respective corresponding thresholds, applications in each application set are sorted based on usage and weights of CPU and memory resources occupied by each application in the application set.

Optionally, in this embodiment of this application, applications in an application set may be grouped based on association between the applications.

Association between applications mentioned this embodiment of this application means that the applications are mutually dependent in terms of functions. For example, to perform a function, both an application 1 and an application 2 are required.

Figure 3:
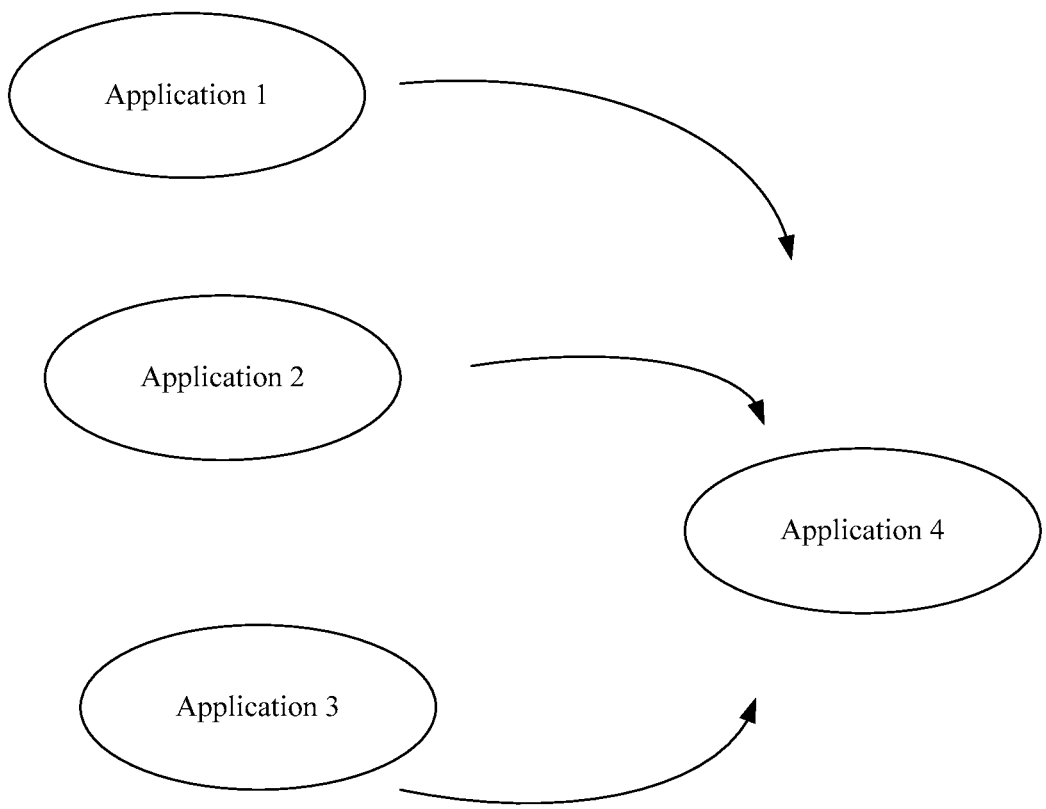
FIG. 3 is a schematic diagram of association between applications according to an embodiment of this application.

As shown in FIG. 3, any one of an application 1, an application 2, and an application 3 is an application associated with an application 4. During startup or running, the application 1, the application 2, and the application 3 may pull up the application 4.

If a currently available resource amount of a system is relatively low, the startup of the application 4 causes waste of system resources and degradation of system performance. Alternatively, the application 1, the application 2, and the application 3 are malicious or unimportant applications. Likewise, pull-up of the application 4 causes waste of system resources and degradation of system performance, and even results in a security problem.

Figure 4:
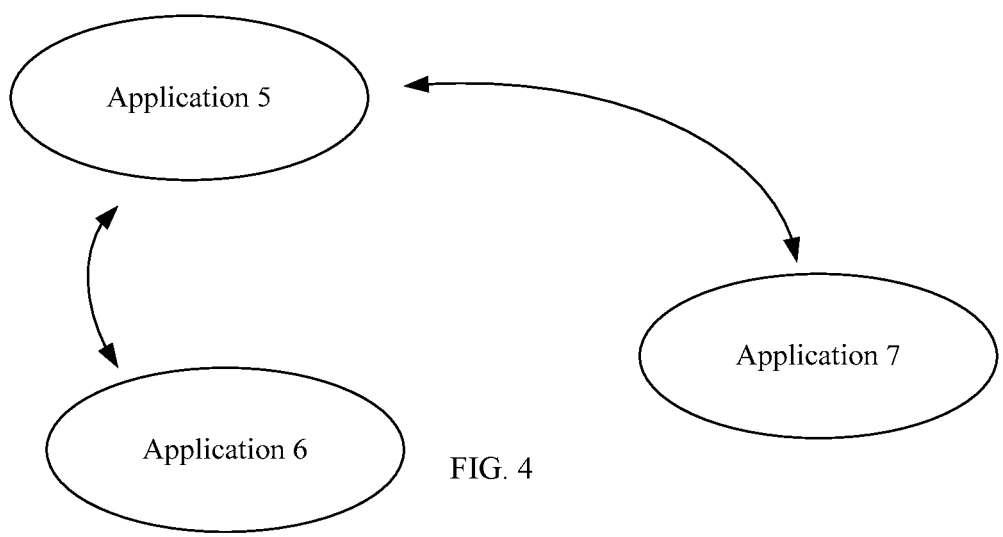
FIG. 4 is a schematic diagram of association between applications according to an embodiment of this application.

As shown in FIG. 4, an application 5, an application 6, and an application 7 are associated with each other. Assuming that an application needs to be cleared from memory when a current memory resource is insufficient, if a priority of the application 5 is lower, the application 5 may be cleared first. Because the application 6 and the application 7 are associated applications of the application 5, during running, the application 6 or the application 7 pulls up the application 5. However, because the memory resource is insufficient, the application 5 is continuously cleared, but is continuously pulled up by the application 6 or the application 7, thereby causing resource waste.

Therefore, in this embodiment of this application, associated applications may be grouped into one group, and during resource control, control is performed by using an application group as a unit. This can avoid waste of system resources and degradation of system performance.

For example, if an application A triggers startup of an application B during startup or running, it is determined that the application A and the application B are associated. In this case, the application A and the application B may be grouped into one group.

Optionally, if an application is associated with a plurality of applications, the application and any one of the plurality of applications may be grouped into one group. Specifically, the application and an application with a high priority may be grouped into one group.

Optionally, in this embodiment of this application, priorities of application groups may be sorted.

Specifically, the priorities of the application groups may be sorted based on at least one of resource use information and user use information of applications in the application groups.

Optionally, in this embodiment of this application, after the priorities of the application groups are sorted, group adjustment may be performed based on the priority sorting. For example, an application A is associated with an application B and an application C. If the application A and the application B are grouped into one group, and the application C is grouped into another group, and a priority of the group to which the application C belongs is higher than that of the group to which the application A and the application B belong, the application A may be adjusted to belonging to the same group as the application C.

Optionally, in this embodiment of this application, resources may be controlled for application sets by using an application group as a unit.

For example, when an available resource of a system is less than or equal to a preset threshold, a resource is restricted for at least one application group.

Optionally, in this embodiment of this application, when it is determined that a first application triggers startup of a second application, it may be determined, based on priority information of the first application, whether the second application needs to be started; and the second application is started when it is determined that the second application needs to be started.

For example, assuming that the first application belongs to an application set with a relatively high priority, it is determined that the second application is to be started; or assuming that the first application belongs to an application set with a relatively low priority, it is determined that the second application is not to be started.

For another example, assuming that the first application is an application, ranked relatively ahead in priority sorting, in an application set, it may be determined that the second application is to be started; or assuming that the first application is an application, ranked relatively behind in priority sorting, in the application set, it may be determined that the second application is not to be started.

Therefore, in this embodiment of this application, applications are sorted based on at least one of resource use information of the applications and user use information of the applications, to control the sorted applications. Therefore, the applications can be controlled in real time with reference to the resource use information of the applications and/or the user use information of the applications, resource waste can be avoided, and system performance and user experience can be improved.

Figure 5:
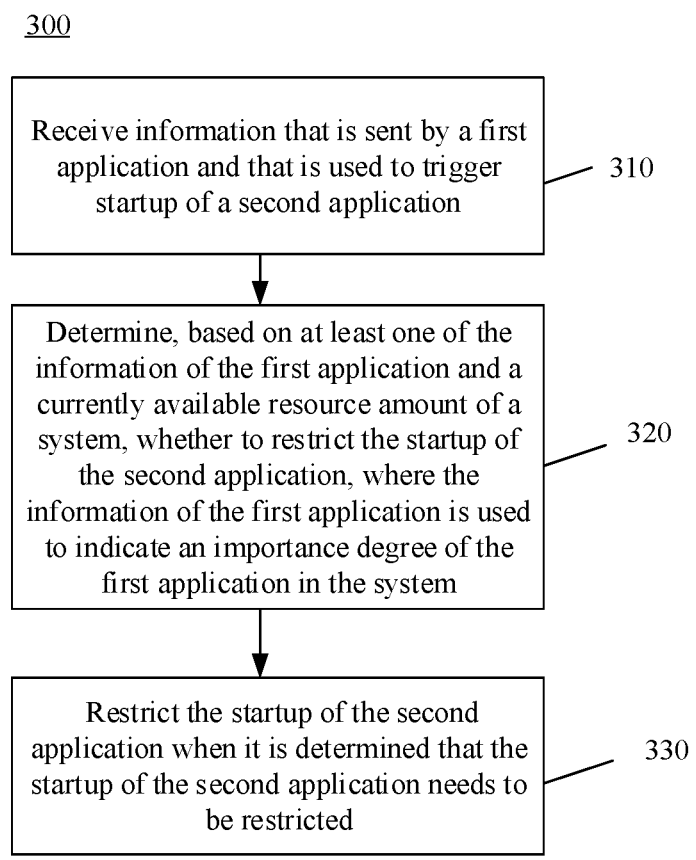
FIG. 5 is a schematic flowchart of a control method according to an embodiment of this application.

FIG. 5 is a schematic flowchart of an application startup method 300 according to an embodiment of this application. As shown in FIG. 5, the method 300 may include the following content.

Step 310: Receive information that is sent by a first application and that is used to trigger startup of a second application.

Optionally, in this embodiment of this application, the startup of the second application may be triggered during startup or running of the first application.

For example, when a shopping application starts, the startup of the shopping application triggers startup of a payment application; or during running of a shopping application, startup of a payment application is triggered.

Optionally, in this embodiment of this application, a manner of triggering the startup of the second application by the first application may be a broadcast manner. For example, the first application broadcasts information. The information may trigger startup of a plurality of applications, and the plurality of applications include the second application.

Optionally, in this embodiment of this application, a manner of triggering the startup of the second application by the first application may be performing triggering in a trigger manner specific to the second application.

Step 320: Determine, based on at least one of the information of the first application and a currently available resource amount of a system, whether to restrict the startup of the second application. The information of the first application is used to indicate an importance degree of the first application in the system.

Optionally, in this embodiment of this application, a currently available resource in the system may include at least one of a central processing unit (CPU) resource, a memory resource, and an input/output (IO) resource.

Optionally, in this embodiment of this application, the information of the first application is used to indicate an importance degree of the first application in the system.

Optionally, the information of the first application may directly indicate the importance degree of the first application in the system. For example, the information of the first application may include priority information of the first application relative to a plurality of applications.

Specifically, the information of the first application includes level information of the first application, where the system includes a plurality of levels of applications, and the level information of the first application is used to indicate an application level to which the first application belongs.

Optionally, the information of the first application may indirectly indicate the importance degree of the first application in the system.

Specifically, the information of the first application includes attribute information of the first application, and the attribute information of the first application may be used to indicate whether the first application is a basic application that ensures normal running of the system. If the first application is a basic application that ensures normal running of the system, it indicates that the first application is relatively important in the system; or if the first application is not a basic application that ensures normal running of the system, it indicates that the first application is relatively unimportant in the system.

In an implementation of this embodiment of this application, when it is determined that the startup of the second application is triggered by the first application, it may be determined whether the currently available resource amount of the system is less than or equal to a specified threshold. If the currently available resource amount of the system is less than or equal to the specified threshold, the startup of the second application is restricted; or if the currently available resource amount of the system is greater than the specified threshold, the second application can be started.

Optionally, for the threshold mentioned herein, thresholds may be separately set for a plurality of resources. For example, a resource threshold that is set for a CPU resource is 50%, a resource threshold that is set for memory is 60%, and a threshold that is set for an IO resource is 70%. The second application is started only when all of the following conditions are satisfied: An available CPU resource amount is greater than or equal to 50%, an available memory resource amount is greater than or equal to 60%, and an available resource amount of the IO resource is greater than or equal to 70%; or the startup of the second application is restricted if an available resource amount of any resource does not reach a threshold. Alternatively, the second application is started when an available resource amount of any resource is greater than or equal to a specified threshold.

Optionally, in this embodiment of this application, a single threshold may alternatively be set for a plurality of resources. For example, a specified threshold is 55%. Different weights may be set for different resources. For example, a CPU weight is 0.5, a specified memory weight is 0.4, and a specified IO weight is 0.3. Assuming that a currently available CPU resource amount of the system is 50%, an available memory resource amount is 60%, and an available resource amount of an IO resource is 70%, a weighted value of the currently available resource amount of the system may be calculated: 0.5×50%+0.4×50%+0.3×70%=66%. Because 66% is greater than 55%, it is determined that the second application is to be started.

Optionally, in this embodiment of this application, a threshold may be set only for one resource. For example, a threshold is set only for a CPU. For example, the threshold that is set for the CPU is 50%. When a currently available CPU resource amount of the system is less than or equal to 50%, it is determined to restrict the startup of the second application, regardless of an available amount of a memory resource or an IO resource.

In another implementation of this embodiment of this application, when it is determined that the startup of the second application is triggered by the first application, it may be determined whether the first application is an application with a relatively high priority. If the first application is an application with a relatively high priority, the second application may be started; or if the first application is not an application with a relatively high priority, the startup of the second application may be restricted.

For example, assuming that there are a total of 10 applications, if the first application is ranked among the first five in priority sorting, it may be determined that the second application is to be started; otherwise, it may be determined that the startup of the second application needs to be restricted.

In another implementation of this embodiment of this application, when the level information of the first application is used to indicate that the level of the first application is higher than a preset level, it is determined not to restrict the startup of the second application; or when the level information of the first application is used to indicate that the level of the first application is lower than or equal to the preset level, it is determined to restrict the startup of the second application.

For example, assuming that there are a total of three application levels, a priority of a level A is higher than a priority of a level B, and the priority of the level B is higher than a priority of a level C, if the first application belongs to the level A, the second application may be started; or if the first application belongs to the level C, it is determined that the startup of the second application needs to be restricted.

In another implementation of this embodiment of this application, applications in the system are corresponding to a plurality of levels. Different application levels are corresponding to different resource amount thresholds. A control device may determine, based on the level information of the first application, the application level to which the first application belongs; determine a resource amount threshold corresponding to the application level to which the first application belongs; and when the currently available resource amount of the system is less than or equal to the resource amount threshold corresponding to the application level to which the first application belongs, determine to restrict the startup of the second application.

For example, three levels are set for the applications in the system. A resource amount threshold of a highest level may be set to 0, to be specific, if the level of the first application is the highest level, the second application may be directly started. A resource amount threshold of a medium level may be set to 50%, to be specific, if the first application belongs to the medium level, when the currently available resource amount of the system is less than or equal to 50%, it may be determined that the startup of the second application needs to be restricted. When an application in the system is an application of a lowest level, a resource amount threshold corresponding to the level may be set to 100%, equivalent to that the startup of the second application needs to be always restricted in any case.

Optionally, sorting the applications in the system may be: sequentially sorting the applications by using an application as a unit.

For example, the system includes an application A, an application B, an application C, an application D, an application E, an application F, and an application G. The applications may be sequentially sorted based on resource use information, user use information, and attribute information of the applications. For example, a priority of the application A is highest, a priority of the application D and the application C are second highest, a priority of the application E and the application G are third highest, a priority of the application B is fourth highest, and a priority of the application F is lowest.

Optionally, sorting priorities of the applications in the system may be: dividing application sets, and sorting priorities of the sets.

Optionally, each application set is corresponding to one application level.

Optionally, in this embodiment of this application, application levels of the applications in the system are classified based on at least one of historical use information, attribute information, and current running status information of each application in the system.

Optionally, the historical use information of the application includes at least one of use frequency, duration of each use, and a jump relationship of the application; and/or the attribute information of the application includes information used to indicate whether the application is a basic application that ensures normal running of the system; and/or the current running status information of the application includes information used to indicate that the application is currently running in the foreground, or is running in the background and can be perceived by a user, or is running in the background and cannot be perceived by a user.

For example, the applications may be classified into the following three levels, which may also be referred to as three application sets:

(1) a first application level, including a basic application that ensures normal running of the system, and an application that is running in the foreground;

(2) a second application level, including an application that is running in the background and that can be perceived by a user, and an application whose historical user usage is greater than a preset value; and (3) a third application level, including another application in the system other than applications of the first application level and the second application level.

A priority of an application at this level is lowest. For example, this level may include an application not frequently used by a user, an application unimportant to the system, and a malicious application.

It should be understood that the foregoing level division is merely an optional implementation of this embodiment of this application, and should not constitute any limitation on the scope of the embodiments of this application.

Optionally, in this embodiment of this application, a manner of restricting the startup of the second application may be determined based on at least one of the information of the first application, the currently available resource amount of the system, and the manner of triggering the startup of the second application by the first application. The startup of the second application is restricted in the manner.

Optionally, restricting startup may include prohibiting startup or delaying startup.

Optionally, for the delaying startup, a timer may be set. When the timer expires, an application whose startup is delayed may be started.

Optionally, in this embodiment of this application, the manner of restricting the startup of the second application may be determined based on a correspondence between a startup restriction manner and at least one of information of an application, an available resource amount of the system, and a manner of triggering startup of the application, and at least one of the information of the first application, the currently available resource amount of the system, and the manner of triggering the startup of the second application by the first application. Optionally, the correspondence is pre-configured.

Specifically, the information of the application includes level information of the application, the system includes a plurality of levels of applications, and the level information of the application is used to indicate an application level to which the application belongs; and/or an available resource of the system includes at least one of a central processing unit CPU resource, an input/output IO resource, and a memory resource; and/or the manner of triggering the startup of the application includes triggering the startup by using broadcast or triggering the startup in an application-specific manner.

For example, when the manner of triggering the startup of the second application by the first application is the broadcast manner, and the currently available resource amount of the system is less than or equal to a first threshold, it is determined that the startup of the second application needs to be prohibited; or when the manner of triggering the startup of the second application by the first application is the manner specific to the second application, and the currently available resource amount of the system is less than or equal to a first threshold, it is determined that the startup of the second application needs to be delayed.

For another example, when the manner of triggering the startup of the second application by the first application is the broadcast manner, and a priority of the second application after sorting is lower than or equal to a level, it is determined that the startup of the second application needs to be delayed; or when the manner of triggering the startup of the second application by the first application is the manner specific to the second application, and a priority of the second application after sorting is lower than or equal to a level, it is determined that the startup of the second application needs to be prohibited.

For another example, when the currently available resource amount of the system is less than or equal to a first threshold, and the level of the first application is lower than or equal to a first level, it is determined that the startup of the second application needs to be prohibited; or when the currently available resource amount of the system is less than or equal to a first threshold, and the level of the first application is lower than or equal to a second level and higher than a first level, it is determined that the startup of the second application needs to be delayed.

For another example, different application levels are corresponding to different resource amount thresholds. Each application level is corresponding to at least two resource amount thresholds. Different resource amount thresholds in the at least two resource amount thresholds are corresponding to different startup restriction manners. The control device may determine, based on the level information of the first application, the application level to which the first application belongs; determine the resource amount threshold corresponding to the application level to which the first application belongs; when the currently available resource amount of the system is less than or equal to the resource amount threshold corresponding to the application level to which the first application belongs, determine to restrict the startup of the second application; determine a maximum resource amount threshold that is in at least two resource amount thresholds corresponding to the application level to which the first application belongs and that is greater than or equal to a resource amount threshold of the currently available resource amount of the system; determine a startup restriction manner corresponding to the maximum resource amount threshold; and determine the startup restriction manner corresponding to the maximum resource amount threshold as a manner of restricting the startup of the second application. Optionally, the startup restriction manner includes delaying startup and prohibiting startup, and for a same application level, a resource amount threshold corresponding to the prohibiting startup is less than a resource amount threshold corresponding to the delaying startup.

Step 330: Restricte the startup of the second application when it is determined that the startup of the second application needs to be restricted.

For example, the startup of the second application is prohibited when it is determined that the manner of restricting the startup of the second application is the prohibiting startup.

For another example, the startup of the second application is delayed when it is determined that the manner of restricting the startup of the second application is the delaying startup. Specifically, a timer may be started, and the second application is started when the timer expires.

Therefore, in this embodiment of this application, after the first application triggers the startup of the second application, it is determined, based on the at least one of the information of the first application and the currently available resource of the system, whether to restrict the startup of the second application; and the startup of the second application is restricted when it is determined that the startup of the second application needs to be restricted. Resource waste caused because startup of an application is frequently triggered by another application is reduced, and therefore system performance can be improved.

Figure 6:
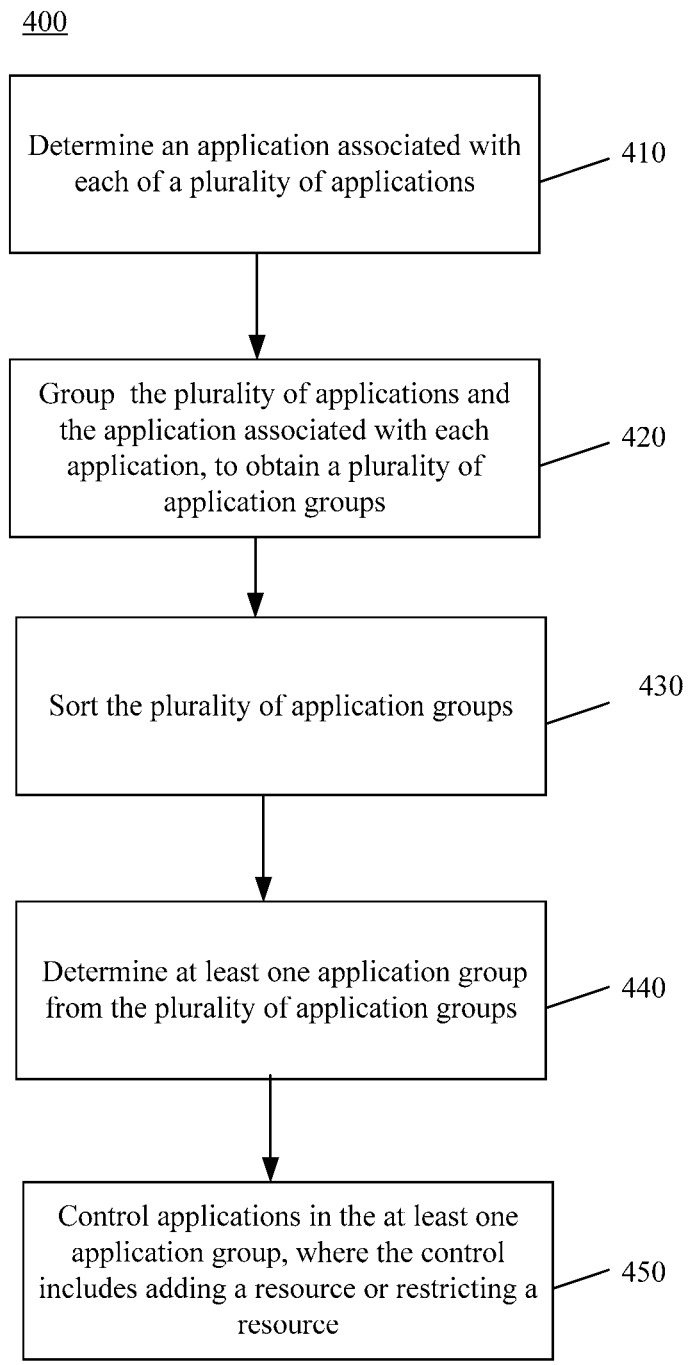
FIG. 6 is a schematic flowchart of a control method according to an embodiment of this application.

FIG. 6 is a schematic flowchart of an application control method 400 according to an embodiment of this application. In the method 400, control may include restricting a resource and adding a resource. As shown in FIG. 6, the application control method 400 includes the following content.

Step 410: Determine an application associated with each of a plurality of applications.

Step 420: Group the plurality of applications and the application associated with each application, to obtain a plurality of application groups. Applications included in each application group are associated applications.

Optionally, in this embodiment of this application, one application belongs to one application group.

Step 430: Sort the plurality of application groups.

Optionally, the plurality of application groups are sorted based on a resource amount occupied by each application group.

Certainly, the plurality of application groups may alternatively be sorted by using other information, such as attribute information or user use information of an application in each application group.

Optionally, in this embodiment of this application, the plurality of application groups may be periodically sorted based on a resource amount occupied by each application group.

Step 440: Determine at least one application group from the plurality of application groups.

Optionally, when the control is adding a resource, and a currently available resource amount of a system is greater than or equal to a first threshold, the at least one application group is determined from the plurality of application groups. When the control is restricting a resource, and a currently available resource amount of a system is less than or equal to a second threshold, the at least one application group is determined from the plurality of application groups.

Optionally, for the threshold mentioned herein, thresholds may be separately set for a plurality of resources. For example, a resource threshold that is set for a CPU resource is 50%, a resource threshold that is set for memory is 60%, and a threshold that is set for an IO resource is 70%. It is determined that a resource needs to be added for at least one application group only when all of the following conditions are satisfied: An available CPU resource amount is greater than or equal to 50%, an available memory resource amount is greater than or equal to 60%, and an available resource amount of the IO resource is greater than or equal to 70%. Alternatively, it is determined that a resource needs to be added for at least one application group when any one of the following conditions is satisfied: An available CPU resource amount is greater than or equal to 50%, an available memory resource amount is greater than or equal to 60%, and an available resource amount of the IO resource is greater than or equal to 70%.

Optionally, in this embodiment of this application, a single threshold may alternatively be set for a plurality of resources. For example, a specified threshold is 55%. Different weights may be set for different resources. For example, a CPU weight is 0.5, a specified memory weight is 0.4, and a specified IO weight is 0.3. Assuming that a currently available CPU resource amount of the system is 50%, an available memory resource amount is 60%, and an available resource amount of an IO resource is 70%, a weighted value of the currently available resource amount of the system may be calculated: 0.5×50%+0.4×50%+0.3×70%=66%. Because 66% is greater than 55%, at least one application group is determined, and a resource is added for the at least one application group.

Optionally, in this embodiment of this application, a threshold may be set only for one resource. For example, a threshold is set only for a CPU. For example, the threshold that is set for the CPU is 50%. When a currently available CPU resource amount of the system is greater than or equal to 50%, at least one application group is determined, and a resource is added for the at least one application group, regardless of an available amount of a memory resource or an IO resource.

Optionally, in this embodiment of this application, at least one application group may alternatively be determined in another case, for example, when CPU temperature is relatively high, and a resource is restricted for the at least one application group.

Optionally, in this embodiment of this application, a quantity of groups selected for performing control may be determined based on a currently available resource and a resource amount threshold of the system, and a data amount used by the selected group is greater than or equal to a difference between the resource amount threshold and the currently available resource amount of the system.

Step 450: Control applications in the at least one application group. The control includes adding a resource or restricting a resource.

Optionally, in this embodiment of this application, after priorities of the application groups are sorted, group adjustment may be performed based on the priority sorting.

Specifically, the first application is associated with at least two applications. The at least two applications are not associated with each other. A group to which the first application belongs is adjusted based on sorting of application groups to which the at least two applications belong.

In an implementation, the control includes restricting a resource. The first application and a second application of the at least two applications currently belong to a first application group. When a priority of a second application group to which a third application of the at least two applications belongs is higher than that of the first application group, the first application is adjusted to belonging to the second application group. A group with a low priority is a group for which a resource is likely to be restricted.

For example, the control includes restricting a resource, and an application A is associated with an application B and an application C. If the application A and the application B are grouped into one group, the application C is grouped into another group, and a priority of the group to which the application C belongs is higher than that of the group to which the application A and the application B belong, the application A may be adjusted to belonging to the same group as the application C.

In another implementation, the control includes adding a resource. The first application and a second application of the at least two applications currently belong to a first application group. When a priority of a second application group to which a third application of the at least two applications belongs is higher than that of the first application group, the first application is adjusted to belonging to the second application group. A group with a high priority is a group for which a resource is likely to be added.

For example, the control includes adding a resource, and an application D is associated with an application E and an application F. If the application D and the application E are grouped into one group, the application F is grouped into another group, and a priority of the group to which the application F belongs is higher than that of the group to which the application D and the application E belong, the application D may be adjusted to belonging to the same group as the application F.

Therefore, in this embodiment of this application, applications are grouped into application groups based on association, and applications in each group are associated applications. In addition, when control is required, control is performed by using an application group as a unit. This can avoid resource waste caused because an associated application of an application is not controlled when the application is controlled.

Figure 7:
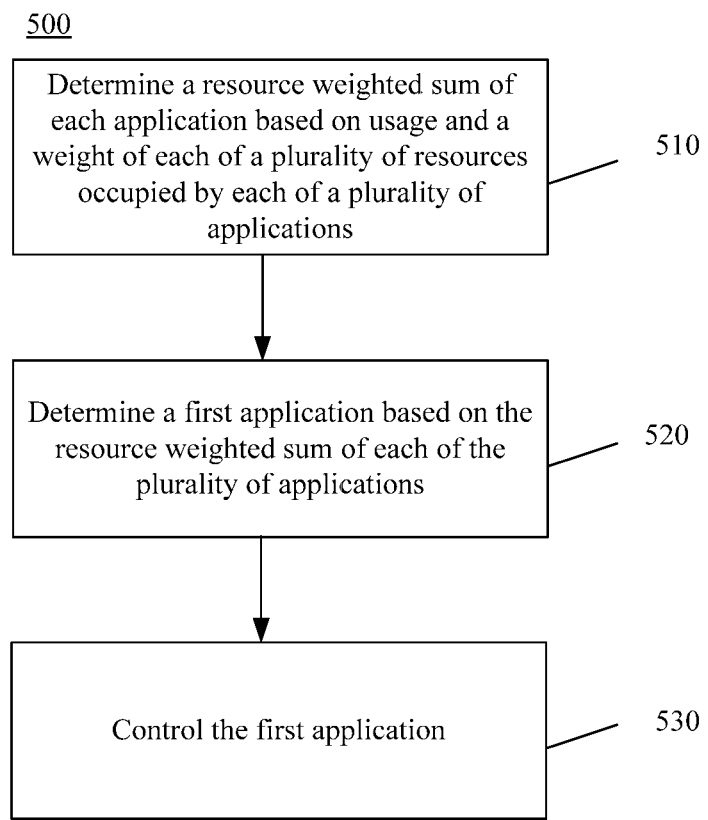
FIG. 7 is a schematic flowchart of a control method according to an embodiment of this application.

FIG. 7 is a schematic flowchart of an application control method 500 according to an embodiment of this application. As shown in FIG. 7, the method includes steps 510 and 520.

Step 510: Determine a resource weighted sum of each application based on usage and a weight of each of a plurality of resources occupied by each of a plurality of applications.

Step 520: Determine a first application based on the resource weighted sum of each of the plurality of applications.

Optionally, the first application may include a plurality of applications.

Optionally, in this embodiment of this application, a single threshold may be set for a plurality of resources. For example, a specified threshold is 55%. Different weights may be set for different resources. For example, a CPU weight is 0.5, a specified memory weight is 0.4, and a specified IO weight is 0.3. Assuming that a currently available CPU resource amount of a system is 50%, an available memory resource amount is 60%, and an available resource amount of an IO resource is 70%, a weighted value of a currently available resource amount of the system may be calculated: 0.5×50%+0.4×50%+0.3×70%=66%. Because 66% is greater than 55%, it is determined that no resource needs to be restricted for an application.

Optionally, in this embodiment of this application, when it is determined that a resource amount of an available resource in the system is less than or equal to a specified threshold, the first application is determined based on the usage and the weight of each of the plurality of resources occupied by each of the plurality of applications.

Optionally, in this embodiment of this application, the plurality of applications may be determined from the applications in the system based on priority sorting of applications in the system, and the first application is determined from the plurality of applications.

Specifically, a first application set may be determined based on priority sorting of a plurality of application sets, and the first application is determined based on usage and a weight of each of a plurality of resources occupied by each application in the first application set.

Optionally, in this embodiment of this application, application sets in the system are classified based on at least one of resource use information, user use information, and attribute information of the applications in the system.

Step 530: Control the first application.

Specifically, a resource may be restricted for the first application, or the first application may be started.

Therefore, in this embodiment of this application, an application that needs to be controlled is determined based on the usage and the weight of each of the plurality of resources occupied by each of the plurality of applications. During application control, the plurality of resources can be considered, so that resource waste can be avoided, and system performance is improved.

To verify effects of the application control methods in the embodiments of this application, the inventor performs testing by using an Android mobile terminal as an example, and during testing, finds that a startup time and a frame loss rate of an application are reduced when the control methods in the embodiments of this application are applied.

It should be understood that, in the embodiments of this application, the methods 200, 300, 400, and 500 are not mutually exclusive. When there is no contradiction, for explanations of terms, reference may be made to each other, and executions manners of the methods may be used in combination.

The foregoing embodiments describe the application control methods, and the embodiments of this application further provide a control device that can implement any one of the foregoing control methods. The device may have a unit that implements any one of the foregoing methods.

Figure 8:
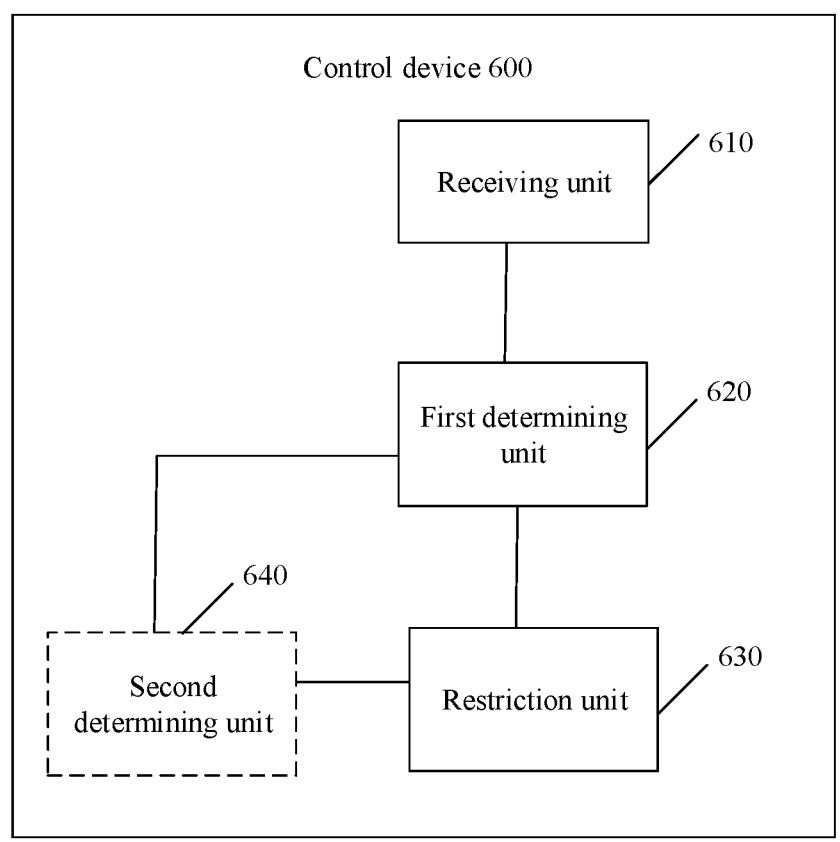
FIG. 8 is a schematic block diagram of a control device according to an embodiment of this application.

For brevity and ease of understanding, with reference to FIG. 8, the following provides description by using a control device corresponding to the application startup control method 300 shown in FIG. 5 as an example.

FIG. 8 is a schematic block diagram of a control device 600 according to an embodiment of this application. As shown in FIG. 8, the control device 600 may include a receiving unit 610, a first determining unit 620, and a restriction unit 630.

The receiving unit 610 is configured to receive information that is sent by a first application and that is used to trigger startup of a second application. The first determining unit 620 is configured to determine, based on at least one of the information of the first application and a currently available resource amount of a system, whether to restrict the startup of the second application, where the information of the first application is used to indicate an importance degree of the first application in the system. The restriction unit 630 is configured to restrict the startup of the second application when the first determining unit determines that the startup of the second application needs to be restricted.

Optionally, the information of the first application includes level information of the first application, where the system includes a plurality of levels of applications, and the level information of the first application is used to indicate an application level to which the first application belongs.

Optionally, the first determining unit 620 is specifically configured to: when the level information of the first application is used to indicate that the level of the first application is higher than a preset level, determine not to restrict the startup of the second application.

Optionally, different application levels are corresponding to different resource amount thresholds. The first determining unit 620 is specifically configured to: determine, based on the level information of the first application, the application level to which the first application belongs; determine a resource amount threshold corresponding to the application level to which the first application belongs; and when the currently available resource amount of the system is less than or equal to the resource amount threshold corresponding to the application level to which the first application belongs, determine to restrict the startup of the second application.

Optionally, each application level is corresponding to at least two resource amount thresholds. Different resource amount thresholds in the at least two resource amount thresholds are corresponding to different startup restriction manners. As shown in FIG. 8, the device 600 further includes a second determining unit 640. The second determining unit 640 is configured to: determine a maximum resource amount threshold that is in at least two resource amount thresholds corresponding to the application level to which the first application belongs and that is greater than or equal to a resource amount threshold of the currently available resource amount of the system; determine a startup restriction manner corresponding to the maximum resource amount threshold; and determine the startup restriction manner corresponding to the maximum resource amount threshold as a manner of restricting the startup of the second application.

The restriction unit 630 is configured to restrict the startup of the second application in the manner determined by the second determining unit.

Optionally, the startup restriction manner includes delaying startup and prohibiting startup, and for a same application level, a resource amount threshold corresponding to the prohibiting startup is less than a resource amount threshold corresponding to the delaying startup.

Optionally, application levels of applications in the system are classified based on at least one of historical use information, attribute information, and current running status information of each application in the system.

Optionally, the historical use information of the application includes at least one of use frequency, duration of each use, and a jump relationship of the application; and/or the attribute information of the application includes information used to indicate whether the application is a basic application that ensures normal running of the system; and/or the current running status information of the application includes information used to indicate that the application is currently running in the foreground, or is running in the background and can be perceived by a user, or is running in the background and cannot be perceived by a user.

Optionally, the applications in the system include the following three application levels:

a first application level, including a basic application that ensures normal running of the system, and an application that is running in the foreground;

a second application level, including an application that is running in the background and that can be perceived by a user, and an application whose historical user usage is greater than a preset value; and a third application level, including another application in the system other than applications of the first application level and the second application level.

Optionally, as shown in FIG. 8, the device further includes a second determining unit 640. The second determining unit 640 is configured to determine a manner of restricting the startup of the second application.

The first determining unit 620 is specifically configured to restrict the startup of the second application in the manner determined by the second determining unit 640.

Optionally, the second determining unit 640 is specifically configured to determine the manner of restricting the startup of the second application based on at least one of the information of the first application, the currently available resource amount of the system, and a manner of triggering the startup of the second application by the first application.

Optionally, the second determining unit 640 is specifically configured to determine the manner of restricting the startup of the second application based on a correspondence between a startup restriction manner and at least one of information of an application, an available resource amount of the system, and a manner of triggering startup of the application, and at least one of the information of the first application, the currently available resource amount of the system, and the manner of triggering the startup of the second application by the first application.

Optionally, the information of the application includes level information of the application, the system includes a plurality of levels of applications, and the level information of the application is used to indicate an application level to which the application belongs; and/or an available resource of the system includes at least one of a central processing unit CPU resource, an input/output IO resource, and a memory resource; and/or the manner of triggering the startup of the application includes triggering the startup by using broadcast or triggering the startup in an application-specific manner.

Optionally, the manner of restricting the startup of the second application includes prohibiting starting the second application, or delaying starting the second application.

It should be understood that the control device 600 may implement the application startup control method 300 shown in FIG. 5. For brevity, details are not described herein again. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application startup control method performed by a computer device, comprising:

receiving a first information sent by a first application, wherein the first information is used to trigger a startup of a second application;

determining, (1) based on a second information of the first application or (2) based on the second information of the first application and an available resource amount of a system of the computer device, whether to restrict startup of the second application which is to be triggered by the first application, wherein the second information of the first application indicates an importance degree of the first application in the system; and restricting the startup of the second application in response to determining to restrict the startup of the second application;

wherein the second information of the first application comprises level information of the first application, wherein the level information of the first application indicates an application level of the first application, and wherein the application level is comprised in a plurality of levels determined based on at least one of historical use information, attribute information, or current running status information of a plurality of applications comprised in the system.

2. The method according to claim 1, wherein the determining, (1) based on a second information of the first application or (2) based on the second information of the first application and an available resource amount of a system of the computer device, whether to restrict the startup of the second application comprises:

determining not to restrict the startup of the second application when the level information of the first application indicates that the application level of the first application is higher than a preset level.

3. The method according to claim 1, wherein the determining, (1) based on a second information of the first application or (2) based on the second information of the first application and an available resource amount of a system of the computer device, whether to restrict the startup of the second application comprises:

determining to restrict the startup of the second application when the level information of the first application indicates that the application level of the first application is lower than or equal to a preset level.

4. The method according to claim 1, wherein different application levels are corresponding to different resource amount thresholds; and wherein the determining, (1) based on a second information of the first application or (2) based on the second information of the first application and an available resource amount of a system of the computer device, whether to restrict the startup of the second application comprises:

determining, based on the level information of the first application, the application level to which the first application belongs;

determining a resource amount threshold corresponding to the application level to which the first application belongs; and determining to restrict the startup of the second application when the available resource amount of the system is less than or equal to the resource amount threshold.

5. The method according to claim 4, wherein each application level is corresponding to at least two resource amount thresholds, wherein different resource amount thresholds in the at least two resource amount thresholds are corresponding to different startup restriction manners, and wherein the method further comprises:

determining a maximum resource amount threshold of at least two resource amount thresholds corresponding to the application level to which the first application belongs;

determining a startup restriction manner corresponding to the maximum resource amount threshold; and wherein the restricting the startup of the second application comprises:

restricting the startup of the second application in the determined startup restriction manner.

6. The method according to claim 5, wherein the startup restriction manner comprises delaying startup and prohibiting startup, and wherein for a same application level, a resource amount threshold corresponding to the prohibiting startup is less than a resource amount threshold corresponding to the delaying startup.

7. The method according to claim 1, wherein at least one of:

the historical use information comprises at least one of use frequency, duration of each use, or a jump relationship of the application;

the attribute information comprises information indicating whether the application is a basic application that ensures normal running of the system; or the current running status information comprises information indicating that the application is currently running in a foreground of the system, or is running in a background of the system and is perceived by a user, or is running in the background and is not perceived by a user, but invisible to the user.

8. The method according to claim 7, wherein the applications in the system comprise the following three application levels:

a first application level, comprising a basic application that ensures normal running of the system, and an application that is running in the foreground;

a second application level, comprising an application that is running in the background and that can be perceived by a user, and an application whose historical user usage is greater than a preset value; and a third application level, comprising another application in the system other than applications of the first application level and the second application level.

9. The method according to claim 1, wherein the method further comprises:

determining a manner of restricting the startup of the second application; and wherein the restricting the startup of the second application comprises:

restricting the startup of the second application in the determined manner.

10. The method according to claim 9, wherein the determining a manner of restricting the startup of the second application comprises:

determining the manner of restricting the startup of the second application based on at least one of the information of the first application, the available resource amount of the system, and a manner of triggering the startup of the second application by the first application.

11. The method according to claim 10, wherein the determining a manner of restricting the startup of the second application comprises:

determining the manner of restricting the startup of the second application based on a correspondence between a startup restriction manner and at least one of the information of the first application, the available resource amount of the system, and the manner of triggering the startup of the second application by the first application.

12. The method according to claim 11, wherein at least one of:

the second information of the first application comprises level information of the first application, wherein the system comprises a plurality of levels of applications, and wherein the level information of the first application indicates an application level to which the first application belongs;
an available resource of the system comprises at least one of a central processing unit (CPU) resource, an input/ output (IO) resource, and a memory resource; or
the manner of triggering the startup of the application comprises triggering the startup by using broadcast or triggering the startup in an application-specific manner.

13. The method according to claim 1, wherein the restricting the startup of the second application comprises prohibiting starting the second application, or delaying starting the second application.

14. A computer device, comprising:
a memory comprising instructions; and
one or more processors in communication with the memory, wherein the one or more processors execute the instructions to:
receive a first information sent by a first application, wherein the first information is used to trigger a startup of a second application;
determine, (1) based on a second information of the first application or (2) based on the second information of the first application and an available resource amount of a system of the computer device, whether to restrict startup of the second application which is to be triggered by the first application, wherein the second information of the first application indicates an importance degree of the first application in the system; and
restrict the startup of the second application in response to determining to restrict the startup of the second application;
wherein the second information of the first application comprises level information of the first application, wherein the level information of the first application indicates an application level of the first application, and wherein the application level is comprised in a plurality of levels determined based on at least one of historical use information, attribute information, or current running status information of a plurality of applications comprised in the system.

15. The computer device according to claim 14, wherein the one or more processors further execute the instructions to:
determine not to restrict the startup of the second application when the level information of the first application indicates that the application level of the first application is higher than a preset level.

16. The computer device according to claim 14, wherein the one or more processors further execute the instructions to:
determine to restrict the startup of the second application when the level information of the first application indicates that the application level of the first application is lower than or equal to a preset level.

17. The computer device according to claim 14, wherein different application levels are corresponding to different resource amount thresholds; and
wherein the one or more processors further execute the instructions to:
determine, based on the level information of the first application, the application level to which the first application belongs;
determine a resource amount threshold corresponding to the application level to which the first application belongs; and
determine to restrict the startup of the second application when the available resource amount of the system is less than or equal to the resource amount threshold.

18. The computer device according to claim 17, wherein an application level is corresponding to at least two resource amount thresholds, wherein different resource amount thresholds in the at least two resource amount thresholds are corresponding to different startup restriction manners, and
wherein the one or more processors further execute the instructions to:
determine a maximum resource amount threshold of at least two resource amount thresholds corresponding to the application level to which the first application belongs;
determine a startup restriction manner corresponding to the maximum resource amount threshold; and
restrict the startup of the second application in the determined startup restriction manner.

19. The computer device according to claim 18, wherein the startup restriction manner comprises delaying startup and prohibiting startup, and wherein for a same application level, a resource amount threshold corresponding to the prohibiting startup is less than a resource amount threshold corresponding to the delaying startup.

20. The computer device according to claim 14, wherein at least one of:
the historical use information comprises at least one of use frequency, duration of each use, or a jump relationship of the application;
the attribute information comprises information indicating whether the application is a basic application that ensures normal running of the system; or
the current running status information comprises information indicating that the application is currently running in a foreground of the system, or is running in a background of the system and is perceived by a user, or is running in the background and is not perceived by a user, but invisible to the user.

21. The computer device according to claim 20, wherein the applications in the system comprise the following three application levels:
a first application level, comprising a basic application that ensures normal running of the system, and an application that is running in the foreground;
a second application level, comprising an application that is running in the background and that can be perceived by a user, and an application whose historical user usage is greater than a preset value; and
a third application level, comprising another application in the system other than applications of the first application level and the second application level.

22. The computer device according to claim 14, wherein the one or more processors further execute the instructions to:
determine a manner of restricting the startup of the second application; and
restrict the startup of the second application in the determined manner.

23. The computer device according to claim 22, wherein:
the one or more processors further execute the instructions to:
determine the manner of restricting the startup of the second application based on at least one of the information of the first application, the available resource amount of the system, and a manner of triggering the startup of the second application by the first application.

24. The computer device according to claim 23, wherein the one or more processors further execute the instructions to:
   determine the manner of restricting the startup of the second application based on a correspondence between a startup restriction manner and at least one of the information of the first application, the available resource amount of the system, and the manner of triggering the startup of the second application by the first application.

25. The computer device according to claim 14, wherein the one or more processors further execute the instructions to:
   prohibit starting the second application, or delay starting the second application.

26. A non-transitory storage medium, comprising instructions when executed by one or more processors causing the one or more processors to:
   receive a first information sent by a first application, wherein the first information is used to trigger a startup of a second application;
   determine, (1) based on a second information of the first application or (2) based on the second information of the first application and an available resource amount of a system of a computer device, whether to restrict startup of the second application which is to be triggered by the first application, wherein the second information of the first application indicates an importance degree of the first application in the system; and
   restrict the startup of the second application in response to determining to restrict the startup of the second application;
   wherein the second information of the first application comprises level information of the first application, wherein the level information of the first application indicates an application level of the first application, and wherein the application level is comprised in a plurality of levels determined based on at least one of historical use information, attribute information, or current running status information of a plurality of applications comprised in the system.

* * * * *

UNITED STATES PATENT AND TRADEMARK OFFICE
CERTIFICATE OF CORRECTION

PATENT NO. : 11,474,831 B2
APPLICATION NO. : 16/387643
DATED : October 18, 2022
INVENTOR(S) : Huifeng Hu, Jiechun Li and Xiaodong Su Page 1 of 1

It is certified that error appears in the above-identified patent and that said Letters Patent is hereby corrected as shown below:

On the Title Page

Item [72], delete "Hangshou" and insert -- Hangzhou --.

Signed and Sealed this
Twenty-fifth Day of April, 2023

Katherine Kelly Vidal
*Director of the United States Patent and Trademark Office*